United States Patent
Merg et al.

(10) Patent No.: US 10,332,319 B2
(45) Date of Patent: Jun. 25, 2019

(54) METHODS AND SYSTEMS FOR UPDATING DIAGNOSTIC AND REPAIR INFORMATION

(71) Applicant: Snap-on Incorporated, Kenosha, WI (US)

(72) Inventors: Patrick S. Merg, Hollister, CA (US); Roy S. Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 325 days.

(21) Appl. No.: 15/284,698

(22) Filed: Oct. 4, 2016

(65) Prior Publication Data

US 2018/0096539 A1 Apr. 5, 2018

(51) Int. Cl.
*G07C 5/00* (2006.01)
*G07C 5/08* (2006.01)
*G07C 5/02* (2006.01)
*G06Q 10/00* (2012.01)

(52) U.S. Cl.
CPC ............. *G07C 5/008* (2013.01); *G06Q 10/20* (2013.01); *G07C 5/02* (2013.01); *G07C 5/0808* (2013.01)

(58) Field of Classification Search
CPC ........ G07C 5/008; G07C 5/0808; G07C 5/02; G06Q 10/20
See application file for complete search history.

(56) References Cited

U.S. PATENT DOCUMENTS

| | | |
|---|---|---|
| 6,983,200 B2 | 1/2006 | Bodin et al. |
| 7,551,993 B1 | 6/2009 | Cancilla et al. |
| 7,957,860 B2 | 6/2011 | Grier et al. |
| 2002/0007237 A1* | 1/2002 | Phung ................ G05B 23/0216 701/31.4 |
| 2004/0249647 A1 | 12/2004 | Ekpunobi |
| 2007/0294090 A1* | 12/2007 | Thieret .............. G05B 23/0248 705/305 |
| 2008/0183351 A1 | 7/2008 | Grier et al. |

(Continued)

FOREIGN PATENT DOCUMENTS

| | | |
|---|---|---|
| WO | 02/17118 A2 | 2/2002 |
| WO | WO 2015/035056 A2 | 12/2015 |
| WO | 2016/057386 A1 | 4/2016 |

OTHER PUBLICATIONS

International Search Report issued in co-pending Inlernational Patent Application No. PCT/US2017/051978, European Patent Office, dated Nov. 8, 2017, 5 pages.

(Continued)

*Primary Examiner* — Anne M Antonucci
(74) *Attorney, Agent, or Firm* — McDonnell Boehnen Hulbert & Berghoff LLP

(57) ABSTRACT

Methods and systems for updating diagnostic and repair information are disclosed. In an example system, a first request indicative of a vehicle repair issue for a vehicle is received. A diagnostic flowchart for identifying and resolving the vehicle repair issue is then sent. A second request for further technical assistance and vehicle condition data collected during execution of the diagnostic flowchart are received. The diagnostic flowchart and the vehicle condition data are then sent. Diagnostic assistance information and feedback data indicating whether the vehicle repair issue has been identified and resolved are then received, and the diagnostic flowchart is updated accordingly.

28 Claims, 7 Drawing Sheets

(56) References Cited

U.S. PATENT DOCUMENTS

| | | |
|---|---|---|
| 2013/0304306 A1 | 11/2013 | Selkirk et al. |
| 2014/0075356 A1 | 3/2014 | Gray et al. |
| 2014/0336795 A1 | 11/2014 | Asenjo et al. |
| 2015/0066781 A1* | 3/2015 | Johnson .............. G06Q 30/0206 705/305 |
| 2015/0121275 A1 | 4/2015 | Marshall et al. |
| 2016/0071334 A1* | 3/2016 | Johnson ............... G07C 5/0808 701/29.1 |
| 2016/0085864 A1* | 3/2016 | Morimoto .............. G06Q 10/20 707/769 |

OTHER PUBLICATIONS

Written Opinion issued in co-pending International Patent Application No. PCT/US2017/051978, European Patent Office, dated Nov. 8, 2017, 7 pages.

\* cited by examiner

METHODS AND SYSTEMS FOR UPDATING DIAGNOSTIC AND REPAIR INFORMATION

BACKGROUND

Vehicles can be serviced at repair facilities by mechanics (e.g., technicians). The technicians may use any of a variety of hand tools to service (e.g., repair) any of the wide variety of mechanical components on a vehicle. The technicians may also use electronic diagnostic equipment to service (e.g., diagnose) any of the wide variety of electrical components on a vehicle. The technician may use different data during various stages of servicing the vehicle in conjunction with or without the various tools and equipment.

In some situations, a technician requires technical assistance when working on a vehicle. A technician that contacts a technical assistant with respect to a vehicle being worked on typically has to spend several minutes placing a phone call to a technical assistant and explaining to the technical assistant details regarding the vehicle being worked on, the symptom(s) exhibited by the vehicle being worked on, and the diagnosis and repairs performed on the vehicle thus far with respect to the symptom(s). The time the technician takes to establish a phone call with the technical assistant and talking to the technical assistant can lead to decreased work output by the technician and the repair shop at which the vehicle is being worked on.

Moreover, technicians at other repair shops may work on similar vehicles exhibiting the same symptom(s). These other technicians may seek technical assistance from the same or a different technical assistant. The technical assistant(s) may spend a significant amount of time working with technicians to resolve common symptom(s) that are exhibited by similar vehicles.

SUMMARY

The present disclosure describes embodiments that relate to methods and systems for updating diagnostic and repair information.

In one aspect, the present disclosure describes a method performed by a computing server. The method includes: (i) receiving, from a diagnostic computing device, a first request indicative of a vehicle repair issue for a vehicle; (ii) sending, to the diagnostic computing device, a diagnostic flowchart including a sequence of diagnostic steps for identifying and resolving the vehicle repair issue; (iii) receiving, from the diagnostic computing device, (a) a second request for further technical assistance in identifying and resolving the vehicle repair issue, and (b) vehicle condition data collected during execution of the diagnostic flowchart; (iv) sending the diagnostic flowchart and the vehicle condition data to a technical assistance computing device; (v) receiving, from the technical assistance computing device, input data including (a) diagnostic assistance information that the technical assistance computing device sent to the diagnostic computing device based on the diagnostic flowchart and the vehicle condition data, and (b) feedback data indicating whether the vehicle repair issue has been identified and resolved; and (vi) updating the diagnostic flowchart based on the input data.

In another aspect, the present disclosure describes a method performed by a diagnostic computing device. The method includes: (i) sending, to a computing server, a first request indicative of a vehicle repair issue for a vehicle; (ii) receiving, from the computing server, a diagnostic flowchart including a sequence of diagnostic steps for identifying and resolving the vehicle repair issue; (iii) sending, to the computing server, vehicle condition data collected during execution of the diagnostic flowchart; (iv) sending a second request for further technical assistance in identifying and resolving the vehicle repair issue; (v) in response to the second request, receiving, from a technical assistance computing device that is in communication with the computing server, diagnostic assistance information based on the diagnostic flowchart and the vehicle condition data; and (i) sending feedback data indicating whether the vehicle repair issue has been identified and resolved based on the diagnostic assistance information.

In another aspect, the present disclosure describes a system. The system includes a computing server; a diagnostic computing device in communication with the computing server; and a technical assistance computing device in communication with the computing server and the diagnostic computing device, where: (i) the diagnostic computing device sends to the computing server a first request indicative of a vehicle repair issue for a vehicle, (ii) responsively, the computing server sends to the diagnostic computing device a diagnostic flowchart including a sequence of diagnostic steps for identifying and resolving the vehicle repair issue, (iii) the diagnostic computing device sends to the computing server vehicle condition data collected during execution of the diagnostic flowchart, (iv) the diagnostic computing device sends a second request for further technical assistance in identifying and resolving the vehicle repair issue, (v) the computing server sends the diagnostic flowchart and the vehicle condition data to the technical assistance computing device, (vi) based on the diagnostic flowchart and the vehicle condition data, the technical assistance computing device sends diagnostic assistance information to the diagnostic computing device, (vii) the diagnostic computing device sends to the technical assistance computing feedback data indicating whether the vehicle repair issue has been identified and resolved based on the diagnostic assistance information, (viii) the technical assistance computing device sends to the computing server the feedback data and the diagnostic assistance information, and (ix) the computing server updates the diagnostic flowchart based on the diagnostic assistance information and the feedback data.

In another aspect, the present disclosure describes a diagnostic computing device. The diagnostic computing device includes a network interface; one or more processors in communication with the network interface; and at least one computer-readable medium having stored thereon program instructions, that when executed by the one or more processors, cause the one or more processors to perform operations. The operations include: (i) sending, through the network interface to a computing server, a first request indicative of a vehicle repair issue for a vehicle; (ii) receiving, through the network interface from the computing server, a diagnostic flowchart including a sequence of diagnostic steps for identifying and resolving the vehicle repair issue; (iii) sending, through the network interface to the computing server, vehicle condition data collected during execution of the diagnostic flowchart; (iv) sending, through the network interface, a second request for further technical assistance in identifying and resolving the vehicle repair issue; (v) in response to the second request, receiving, through the network interface from a technical assistance computing device that is in communication with the computing server, diagnostic assistance information based on the diagnostic flowchart and the vehicle condition data; and (vi)

sending feedback data indicating whether the vehicle repair issue has been identified and resolved.

In another aspect, the present disclosure describes a technical assistance computing device. The technical assistance computing device includes a network interface; one or more processors in communication with the network interface; and at least one computer-readable medium having stored thereon program instructions, that when executed by the one or more processors, cause the one or more processors to perform operations. The operations include: (i) receiving a request for technical assistance with identifying and resolving a vehicle repair issue, where the request includes an identifier of a diagnostic flowchart session conducted between a computing server and a diagnostic computing device, where during the diagnostic flowchart session, the computing server provided a diagnostic flowchart to the diagnostic computing device, (ii) retrieving, based on the identifier, the diagnostic flowchart and vehicle condition data generated during execution of the diagnostic flowchart at the diagnostic computing device; (iii) based on the diagnostic flowchart and the vehicle condition data, sending diagnostic assistance information to the diagnostic computing device, (iv) receiving feedback data indicating whether the vehicle repair issue has been identified and resolved based on the diagnostic assistance information, (v) sending, to the computing server, the feedback data and the diagnostic assistance information.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
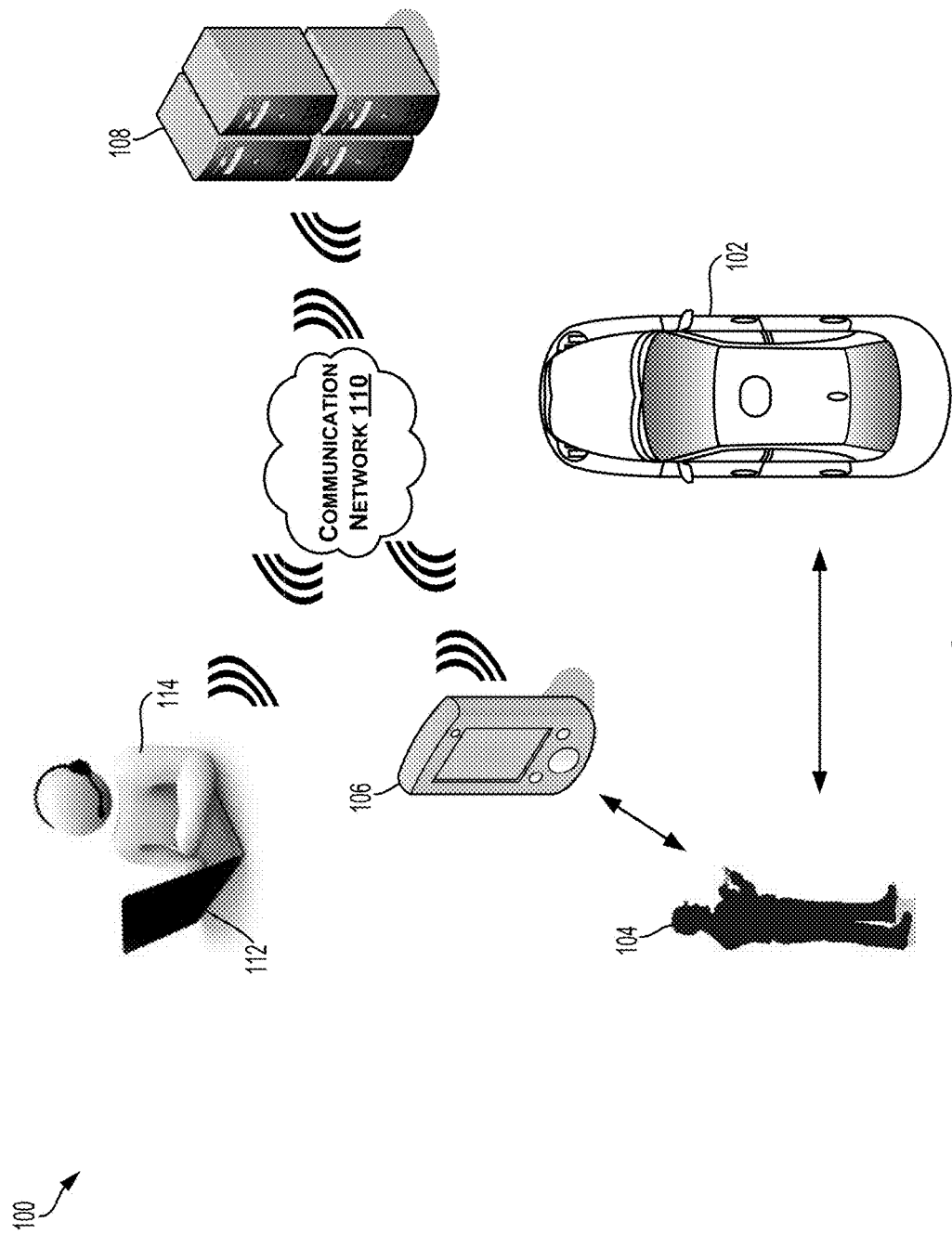
FIG. 1 illustrates a system for updating diagnostic and repair information, in accordance with an example implementation.

The following detailed description describes various features and functions of the disclosed systems and methods with reference to the accompanying figures. The illustrative system and method embodiments described herein are not meant to be limiting. It may be readily understood that certain aspects of the disclosed systems and methods could be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. OVERVIEW

A technician repairing a vehicle may use a diagnostic computing device (e.g., an electronic vehicle repair tool) to obtain information about the vehicle and information (e.g., sensor data) that indicate a condition of the vehicle. The technician could request, via the diagnostic computing device, a diagnostic flowchart from a server that provides diagnostic flowcharts to multiple technicians. Each instance of serving a diagnostic flowchart could be considered a unique diagnostic flowchart session. The server could generate a unique identifier for each diagnostic flowchart session. The diagnostic computing device may display the diagnostic flowchart, and the technician may follow a sequence of performable steps of the diagnostic flowchart.

In some instances, the technician might not be able to resolve and fix a vehicle repair issue (e.g., any vehicle problem that the vehicle is experiencing). The technician could thus request further technical assistance through the diagnostic computing device that displays the diagnostic flowchart. For instance, the technician may send via the diagnostic computing device a request for further technical assistance, contact information, an identifier for the diagnostic session, among other information. The diagnostic computing device could send this information to the server or directly to a technical assistance computing device.

Whether the information is sent to the technical assistance computing device directly or through the server, the technical assistance computing device may gain access to the same information, measurement data, the diagnostic flowchart, etc. that the diagnostic computing device obtained. Thus, the technical assistance computing device or a technical assistant operating it could identify or see the same information the technician is able to see and the steps taken by the technician to identify and resolve the repair issue.

The technical assistance computing device and the technical assistant operating it may then provide advice and technical assistance information to the diagnostic computing device and technician repairing the vehicle. For instance, the technical assistance information and advice may instruct the technician to try a different order of steps or to take extra measurements of vehicle system parameters, etc.

Once the repair issue is identified and resolved, the technical assistance information and advice may be provided to the server. The server may accordingly update the diagnostic flowchart and any associated repair procedure so as to improve the diagnostic flowchart and reduce time of identifying and fixing repair issues in the future.

II. EXAMPLE SYSTEMS

FIG. 1 illustrates a system 100 for updating diagnostic and repair information, in accordance with an example implementation. A vehicle, such as vehicle 102, is a mobile machine that can be used to transport a person, people, or cargo. As an example, any vehicle discussed herein can be driven and/or otherwise guided along a path (e.g., a paved road or otherwise) on land, in water, or in the air or outer space. As another example, any vehicle discussed herein can be wheeled, tracked, railed, or skied. As yet another example, any vehicle discussed herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. As still yet another example, any vehicle discussed herein can include or use any appropriate voltage or current source, such as a battery, an alternator, a fuel cell, and the like, providing any appropriate current or voltage, such as about 12 volts, about 42 volts, and the like. As still yet another example, any vehicle discussed herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle discussed herein can include an engine control unit (ECU), a data link connector (DLC), and a vehicle communication link that connects the DLC to the ECU.

A vehicle manufacturer can build various quantities of vehicles each calendar year (i.e., January 1st to December 31st). In some instances, a vehicle manufacturer defines a model year for a particular vehicle model to be built. The model year can start on a date other than January 1st and/or can end on a date other than December 31st. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle using particular vehicle identifying information. These other features can be identified in various manners, such as a regular production option (RPO) code, such as the RPO codes defined by the General Motors Company LLC, Detroit Mich.

A vehicle communication link within a vehicle can include one or more conductors (e.g., copper wire conductors) or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

An ECU can control various aspects of vehicle operation or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. Performance of a functional test can or a reset procedure with respect to an ECU can comprise the display device 4 transmitting a VDM to a vehicle. A VDM received an ECU can comprise a Parameter ID (PID) request. A VDM transmitted by an ECU can comprise a response comprising the PID and a PID data value for the PID.

The vehicle 102 may experience a malfunction or any other issue that may require adjustment or repair, or may be due for routine maintenance as part of a maintenance schedule, for example. An example vehicle may take a form of an automobile. Alternatively, a vehicle control system may be implemented in or take the form of other vehicles, such as trucks, motorcycles, buses, boats, airplanes, helicopters, lawn mowers, recreational vehicles, amusement park vehicles, farm equipment, construction equipment, trams, golf carts, trains, and trolleys.

A service technician 104 may connect a diagnostic computing device 106 (e.g., a technician tool) to the vehicle 102. The diagnostic computing device 106 could include, for example, a mobile telephone, personal digital assistant (PDA), laptop, notebook, or netbook computer, tablet computing device, or any other electronic diagnostic equipment.

The diagnostic computing device 106 may communicate with the vehicle 102 to retrieve vehicle identification information such as year, make, model, and engine type of the vehicle 102. Also, the diagnostic computing device 106 may be connected to the vehicle 102 to obtain information indicative of a condition of the vehicle 102. For instance, the diagnostic computing device 106 may be connected to a vehicle electronic control module (e.g., engine control module, transmission control module, ABS control module, etc.) to detect the malfunction, e.g., retrieve a Diagnostic Trouble Code DTC indicative of the malfunction. The diagnostic computing device 106 may be configured to communicate with the vehicle 102 over one or more communication protocols used in the vehicle 102 such as Controller Area Network (CAN), SAE (Society of Automotive Engineers) J1850, ISO 9141, Keyword 2000 and others.

The diagnostic computing device 106 may be configured to provide or transmit vehicle information (e.g., the identification information, the information indicative of the condition of the vehicle, repair order, etc.) to a server 108. The vehicle information provided by the diagnostic computing device 106 to the server 108 may also include a geographic location related to a current or prior location of the vehicle 102. The geographic location could include a location of the repair shop, a location where the vehicle 102 experienced a malfunction, an original sale location of the vehicle, locations where the vehicle 102 was previously driven, etc.

The diagnostic computing device 106 may provide or transmit the vehicle information through a communication network 110 (e.g., the internet) to the server 108. The communication network 110 may be wired or wireless and, at least a portion of the network 110, may be external to the server 108 and the diagnostic computing device 106. In some examples, the diagnostic computing device 106 may be configured to communicate directly with the server 108 through point-to-point links. Further, the diagnostic computing device 106 and the server 108 may each include a communication device or interface configured to transmit data to and receive any of the data discussed in this disclosure from the communication network 110.

The server 108 may include or have access to a database storing original equipment manufacturer (e.g., automakers or part suppliers) information including component-specific information such as component specification, wiring diagrams, diagnostic flowcharts, calibration procedures, life expectancy, etc. An example diagnostic flowchart may include a sequence of performable steps that help a technician identify and resolve a vehicle repair issue.

In addition to, or along with the vehicle information, the diagnostic computing device 106 may send a request to the server 108 to obtain vehicle repair information to assist the technician in identifying and resolving the vehicle repair issue. The request and the vehicle information indicate the vehicle repair issue that the vehicle 102 may be experiencing.

In response to receiving the request, the server 108 may initiate a diagnostic flowchart session and generate a unique identifier for the diagnostic flowchart session. The server 108 may also match the received vehicle information to content of the database. For instance, the server 108 may search the database to match the vehicle information (e.g., correlate keywords or combinations of keywords in vehicle information, such as vehicle's model year, make, and model, mileage or odometer reading, etc.) to content of stored repair cases to determine prioritized fixes, relevant component test procedures, relevant diagnostic flowcharts, etc. In another example, matching the received information to the content of the database may include matching the vehicle information to tables or other databases comprising repair test procedures, diagnostic flowcharts, etc. to retrieve relevant repair information.

Based on searching the database, the server 108 may identify and send to the diagnostic computing device 106 a diagnostic flowchart including a sequence of diagnostic steps performable by the technician 104 and the diagnostic computing device 106 to facilitate identifying and resolving the vehicle repair issue. In addition to sending the diagnostic flowchart to the diagnostic computing device 106, the server 108 may also send other repair information such as tips, solutions, potential fixes, a list of parts that may need to be replaced, test procedures, wiring diagrams, repair procedures, questions and answers related to the condition of the vehicle, etc.

The server 108 also provides to the diagnostic computing device 106 the unique identifier of the diagnostic flowchart session initiated by the server 108. This unique identifier facilities future identification of the diagnostic flowchart session and any associated communication, data, and information exchanged during the session.

In an example, as mentioned above, the vehicle information sent to the server 108 may indicate a geographic location related to a current or prior location of the vehicle 102. As such, the server 108 may select the diagnostic flowchart based at least in part on the geographic location. This location-specific diagnostic flowchart may be tailored to the vehicle repair issue as experienced by other vehicles at the geographic location related to the current or prior location of the vehicle 102. In this manner, the diagnostic flowchart outlines steps that facilities identifying and fixing a repair issue that is unique to vehicles associated with a particular geographic location.

For example, vehicles at a particular location in the country may experience particular or unique vehicle issues associated with weather conditions at the location, elevation at the location, vehicle components installed specifically on vehicles operating at the location, etc. The server 108 may thus take the location of the vehicle 102 into consideration when identifying or selecting the diagnostic flowchart to be sent to the diagnostic computing device 106.

The technician 104 may follow the performable steps of the flowchart to identify and fix the vehicle repair issue. During execution of the diagnostic flowchart, the technician 104 may mark or indicate on the diagnostic flowchart the path that the technician 104 has followed, e.g., by clicking on the blocks that were executed along the path.

In one example, the diagnostic flowchart may be color-coded to indicate the path followed by the technician 104. For instance, the path followed by the technician may be colored or presented in a bright manner on a display of the diagnostic computing device 106. Other paths not followed, may be greyed-out or colored in red, for example.

Also, if the technician 104 takes measurements of vehicle parameters (e.g., voltages, temperatures, etc.) and the measurements are within normal range, then a diagnostic flowchart block associated with this measurement may be colored in green. In contrast, if the measurements are outside the normal range, then a diagnostic flowchart block associated with this measurement may be colored in red.

In an example, the technician 104 may also mark whether the diagnostic flowchart was confusing, or mark a diagnostic flowchart block that was confusing. For instance, the technician 104 may add notes to the diagnostic flowchart in general or add notes to be associated with a specific diagnostic flowchart block. In another example, may assign a specific color to the diagnostic flowchart block or a path in the diagnostic flowchart to indicate that the block or path is confusing. Other visual cues could be used on a graphical user interface in addition or alternative to the color coding.

As a particular example, a particular path element or decision block in the diagnostic flowchart may instruct the technician 104 to perform a test to check if voltage in a particular wire is 5 volts. The diagnostic flowchart may further specify that if the measurement indicates a correct voltage, then the technician 104 should execute step "a"; if not, then execute step "b." If the technician 104 measured 5 volts and recorded the measurement, the block associated with performance of that test in the diagnostic flowchart should be highlighted or color-coded accordingly, e.g., with a highlighted with green color. The diagnostic computing device 106 may then highlight or color-code the path or the next step that the technician should execute to reduce any chance of following the wrong path or executing the wrong step.

In an example, instead of the diagnostic computing device 106 providing the entire diagnostic flowchart to technician 104, the diagnostic computing device 106 may provide the diagnostic flowchart sequentially in an interactive manner. For instance, the technician 104 may perform the steps associated with a decision block, e.g., take a measurement and compare the measurement to a threshold value. The diagnostic flowchart may have a first path to be followed if the measurement is greater than the threshold path and a second path to be followed if the measurement is less than or equal to the threshold path. Assuming that the measurement is greater than the threshold value, the diagnostic computing device 106 may provide the blocks and elements of the first path without showing the elements of the second path. In another example, the diagnostic flowchart may include several sections providing steps to be performed to identify alternative causes for the vehicle repair issue, e.g., each section may provide steps to be performed to identify whether a given vehicle repair issue caused a fault. In this example, the server 108 may provide a first section of the diagnostic flowchart to the diagnostic computing device 106, or the diagnostic computing device 106 may display the first section to the technician 104. Then, if the technician 104 follows the steps of this first section but finds no fault with the vehicle 102, then a second section of diagnostic flowchart may be provided to the technician 104, and so on.

In some examples, communication between the server 108 and the diagnostic computing device 106 may be ongoing throughout the diagnostic flowchart session. As such, anytime the technician 104 obtains measurements or performs a step in the diagnostic flowchart, the server 108 may be updated accordingly. In another example, the information associated with execution of the diagnostic flowchart may be sent to the server 108 at an end of the session.

In some instances, however, the technician 104 might not be able to resolve and fix the vehicle repair issue based on the diagnostic flowchart. For example, steps of the diagnostic flowchart may be confusing or might not be clear enough to the technician 104, and as a result, the technician 104 might not be able to correctly or accurately execute the steps of the flowchart, and the flowchart might not resolve the problem.

In another example, the diagnostic flowchart may instruct the technician 104 to make some measurement to obtain vehicle data (e.g., sensor measurements). For instance, these measurements can be made by the diagnostic computing device 106 and/or received thereat via a vehicle communication link. In this example, the diagnostic flowchart may have a decision block that instruct the technician 104 to follow a particular path if the measurement is below a predetermined value, above a predetermined value, or within a predefined range of values. Based on the measurement, the technician 104 may follow a particular path. If these predetermined values or range of values are not accurate or not appropriate for a particular type of vehicles, the technician 104 may follow the wrong path and might not be able to ultimately identify and fix the vehicle issue.

In still another example, the order of steps of the flowchart could confuse the technician or may lead the technician 104 along a wrong path. These are examples for illustration only, and other reasons could render the diagnostic flowchart ineffective. As a result, the technician 104 might not be able to identify and fix the vehicle issue.

The technician 104 may thus seek further technical assistance to identify and resolve the vehicle repair issue. With the system 100, the technician 104 could request technical assistance through the diagnostic computing device 106 that displays the diagnostic flowchart. For instance, the graphical user interface (GUI) of the diagnostic computing device 106 may include a selectable user interface item (e.g., clickable button, a menu item, etc.) for requesting further technical assistance. The technician 104 may use the diagnostic computing device 106 in other ways to request further technical assistance.

In addition to, or included within, the request for further technical assistance, the diagnostic computing device 106 may send contact information (e.g., telephone number or e-mail address) of the technician 104 or the repair shop, and may send the unique identifier of the diagnostic flowchart session initiated by the server 108. The technician 104 may also send along with the request other information such as supplemental information received from an authorized entity such as a vehicle manufacturer, or a vehicle part manufacturer, or a vehicle service information provider. The technician 104 may also input data indicative of an experience level of the technician, an execution time of the at least one path element of the diagnostic flowchart, which could indicate the experience level of the technician, etc.

Further, the diagnostic computing device 106 may send a color-coded diagnostic flowchart marked with the paths followed by the technician 104 and any other information associated with execution of the flowchart, e.g., whether any block or path was confusing, etc. The diagnostic computing device 106 may also send the vehicle data indicative of condition of the vehicle and collected during execution of the diagnostic flowchart. This vehicle data may include, for example, odometer reading of the vehicle, a DTC, a symptom of a malfunction of the vehicle, On-board diagnostics PIDs and PID values, sensor data, and freeze frame data, among other information.

Table 1 illustrates represents example technical assistance requests 1 to 5 and what these requests could include. A technical assistance request may include all or a subset of the types of information shown in table 1. For instance, technical assistance request 1 includes just the unique session identifier. Technical assistance request 4 includes the unique session identifier, the diagnostic flowchart, supplemental information, input data from the technician 104, the vehicle data, and a coded (e.g., color-coded) diagnostic flowchart. Requests 2, 3, and 5 include subsets of the information that could be included in a technical assistance request. The types of information or data shown in table 1 are examples, and other types of information could be added to the request as well.

TABLE 1

| Technical Assistance Request | 1 | 2 | 3 | 4 | 5 |
|---|---|---|---|---|---|
| Unique Session Identifier | X | | | X | X |
| Diagnostic Flowchart | | X | | X | X |
| Supplemental Information | | | X | X | |
| Input Data | | X | | X | |
| Vehicle Data | | X | X | X | X |
| Coded Diagnostic Flowchart | | | | X | |
| Contact Information | | X | | X | |

In an example, the diagnostic computing device 106 may send the request and the above-mentioned information to the server 108. Based on the unique identifier, the server 108 may retrieve the information that was sent to the diagnostic computing device 106 (e.g., the diagnostic flowchart). The server 108 may then send the diagnostic flowchart, the vehicle information, the vehicle data, and the unique session identifier to a technical assistance computing device 112 operated by a technical assistant 114. The server 108 may then hand off communication so that the diagnostic computing device 106 may communicate directly with the technical assistance computing device 112 through the communication network 110. The technical assistance computing device 112 may be at a remote location relative to the server 108 and/or the diagnostic computing device 106.

In another example, instead of or in addition to, sending the information to the server 108, the diagnostic computing device 106 may send the information, i.e., the diagnostic flowchart, the vehicle information, the vehicle data, etc. directly to the technical assistance computing device 112. In still another example, the diagnostic computing device 106 may provide the identifier of the diagnostic flowchart session to the technician assistance computing device 112. The technical assistance computing device 112 may then provide the identifier to the server 108 to retrieve any relevant information (the diagnostic flowchart, the vehicle information, the vehicle data, etc.) associated with this session identifier from the server 108.

In this manner, the identifier may facilitate the diagnostic computing device 106 and the technical assistance computing device 112 displaying common information simultaneously. The common information includes the diagnostic flowchart, the vehicle data, etc. In an example, the technical assistance computing device 112 may have access to a repair order associated with the vehicle repair issue to determine symptoms of the vehicle, which parts were replaced, etc.

Thus, the technical assistance computing device 112 now has access to the information associated with the diagnostic flowchart session. The information may include the vehicle information, the vehicle data, the diagnostic flowchart, and a color-coded version of diagnostic flowchart showing paths followed by the technician 104 and associated information as described above. The technical assistant 114 would therefore be able to see the path taken by the technician 104 (or at least the path the technician should have taken) based on the vehicle data. In the example described above related to the voltage measurement test, the technical assistant 114 should be able to see the color-coded path that the technician 104 followed.

Based on this information, the technical assistance computing device 112 or the technical assistant 114 may determine technical or diagnostic assistance information that could further assist the technician 104 in identifying and resolving the vehicle repair issue. For instance, the technical assistance computing device 112 or the technical assistant 114 may identify any mistakes or missteps by the technician 104. As an example, sensor measurements, meter readings, or other data received from the vehicle 102 might not be expected at a particular step in the diagnostic flowchart, thus indicting that the technician 104 has not executed the diagnostic flowchart correctly. In another example, during execution of the diagnostic flowchart, the technician 104 may navigate to a step that the technician 104 is about to perform. For each step, a corresponding type of measurement or data type may be expected. If there is a mismatch between what is expected and what is received, then the technical assistance computing device 112 may determine that there is an error or misstep in the execution of the diagnostic flowchart. In another example for illustration, a measurement may be expected to have decimals to indicate accuracy of measurement. If the measurement input by the technician 104 does not have decimals, the technical assistance computing device 112 may interpret this measurement value to indicate that the technician 104 might have not performed the measurement accurately, and may thus request that the technician 104 repeats the measurement. Further, if the technician 104 navigates to a wrong step (e.g., out of order step in the diagnostic flowchart), then the technical assistance computing device 112 may determine that there is misstep in the execution of the diagnostic flowchart.

The technical assistance computing device 112 or the technical assistant 114 may also identify any further information, advice, tips, solutions, alternative diagnostic flowcharts, alternative paths in the diagnostic flowchart, etc. As an example, the advice or technical assistance information could include instructions such as "check wiring harness at location X and check the connectors of that wiring harness." The technical assistance information could also include asking the technician 104 to perform labor operations. Example labor operations include cleaning or repairing a component without replacement of the component or any other operation.

The technical assistance computing device 112 may then provide such diagnostic or technical assistance information to the diagnostic computing device 106, and accordingly the technician 104 may implement any advice or steps included in the technical assistance information. Additionally, because the information received at the technical assistance computing device 112 may include contact information (telephone number, email address, etc.) of the technician 104, the technical assistant 114 may contact the technician 104 to provide guidance in implementing the technical assistance information. Both the diagnostic computing device 106 and the technical assistance computing device 112 could be displaying the diagnostic assistance information simultaneously to facilitate interaction between the technician 104 and the technical assistant 114. In an example, a communication channel may be established between the diagnostic computing device 106 and the technical assistance computing device 112 so as to facilitate live streaming from a camera or any other wearable image-capture device that shows the technical assistant 114 what the technician 104 is doing. In another example, the communication channel may facilitate screen sharing between the diagnostic computing device 106 and the technical assistance computing device 112 such that the technical assistant 114 is aware of what is being displayed on a display of, and events taking place at, the diagnostic computing device 106.

Once the vehicle repair issue is identified and resolved based on the technical or diagnostic assistance information, the server 108 may receive from the technical assistance computing device 112 or the diagnostic computing device 106 input data regarding resolving the vehicle repair issue. For instance, the technical assistance computing device 112 or the diagnostic computing device 106 may provide to the server 108 the diagnostic assistance information that the technical assistance computing device 112 provided to the diagnostic computing device 106. Additionally, the technical assistance computing device 112 or the diagnostic computing device 106 may provide to the server feedback data indicating whether the vehicle repair issue has been identified and resolved based on or using the technical assistance information.

If the technical or diagnostic assistance information that the technical assistance computing device 112 provided to the diagnostic computing device 106 helped successfully identifying and resolving the vehicle repair issue, the server 108 may then update the diagnostic flowchart originally provided to the diagnostic computing device 106. For instance, the server 108 may reorder the steps and blocks of the diagnostic flowchart, add blocks, paths, and path elements to the diagnostic flowchart, remove blocks, paths, or path elements to the diagnostic flowchart, modify parameter values (e.g., voltage values and/or PID ranges, etc.) based on which the diagnostic flowchart has led a technician down a particular path, etc.

The server 108 may also add notes to the diagnostic flowchart that facilitates its execution, e.g., clarify how a particular step should be executed. The notes could be generic and apply generally to the diagnostic flowchart or may be specific to a particular path element. The notes could also include labor operations that the technician 104 performed based on the technical assistance information and helped resolve the vehicle repair issue.

In an example, these notes could be specified based on a particular taxonomy and ontology to determine which text/characters is added to diagnostic flowchart or a particular path element therein. Using a particular taxonomy or ontology defines a formal naming and definition of the types, properties, vehicle components, and interrelationships to limit complexity and to organize information.

For instance, the technician 104 or the technical assistant 112 could be prompted to use particular words or terms or preferred text (e.g., through a drop-down menu or some other user interface items) when adding notes or any feedback to the diagnostic flowchart. In this manner, the language used to update the diagnostic flowchart could be universal or consistent between repair shops.

In examples, the server 108 may update or modify the diagnostic flowchart every time feedback is provided based on a diagnostic flowchart session. In other examples, the server 108 may modify the diagnostic flowchart (e.g., modify a path element) if such modification was successful more than a threshold number of times (e.g., 1 or 2 times) in resolving a particular vehicle repair issue.

In an example, the server 108 may include a session manager module that could include a software module, hardware components, or a combination of the two. The session manager may be configured to track progress of the diagnostic flowchart session using the unique identifier generated by the server 108.

The session manager may be in communication with both the diagnostic computing device 106 and the technical assistance computing device 112. In an example, the session manager may be distributed between all three entities: the server 108, the diagnostic computing device 106, and the technical assistance computing device 112. For instance, each of the three entities may include a session manager in communication with respective session managers of the other two entities. In this manner, the session manager could be shared between all three entities. In another example, the session manager could be run independently in the technical assistance computing device 112, the diagnostic computing device 106, and the server 108. Each entity could thus determine different statuses or states with respect to the diagnostic flowchart session.

The states may include, for example, a first state referred to as "active and open." In this first state, communication between at least two of the three entities may be ongoing, and no resolution or feedback has been provided to the server 108 yet.

A second state may be referred to as "inactive and open." In this second state, there might have been no communication within a previous predetermined period of time (e.g., 3 days) between the technical assistance computing device 112 and the diagnostic computing device 106. However, no resolution or feedback has been provided yet to the server 108. Thus, the session is inactive, but remains open because of the lack of feedback.

In this second state, the server 108 may "push" notifications or reminders to either or both of the technical assistance computing device 112 and the diagnostic computing device 106 as long as feedback has not been provided by those devices to the server 108 to close the session. In an example, frequency of the reminders could change. For instance, the reminders may be repeated more frequently as the time since the session became inactive increases beyond a predetermined threshold (e.g., 1 week). In some examples, the diagnostic computing device 106 or the technical assistance computing device 112 could also independently send the reminders to the technician 104 or the technical assistant 114, respectively.

A third state may be referred to as "inactive and closed." In this third state, the session is inactive because there is no ongoing communication between the entities, and additionally, resolution or feedback has been provided to the server 108. Thus, the case or session is or could be closed.

In an example, instead of or in addition to waiting to receive feedback to close the session, the session manager may automatically access the management system of the repair shop to obtain any feedback left by the technician 104 or the diagnostic computing device 106 on the repair order. The feedback may indicate that the repair was successful and that the repair order is marked completed. In this case, the session manager may switch the state of the diagnostic flowchart session to "inactive and closed."

III. EXAMPLE DIAGNOSTIC FLOWCHART

Figure 2:
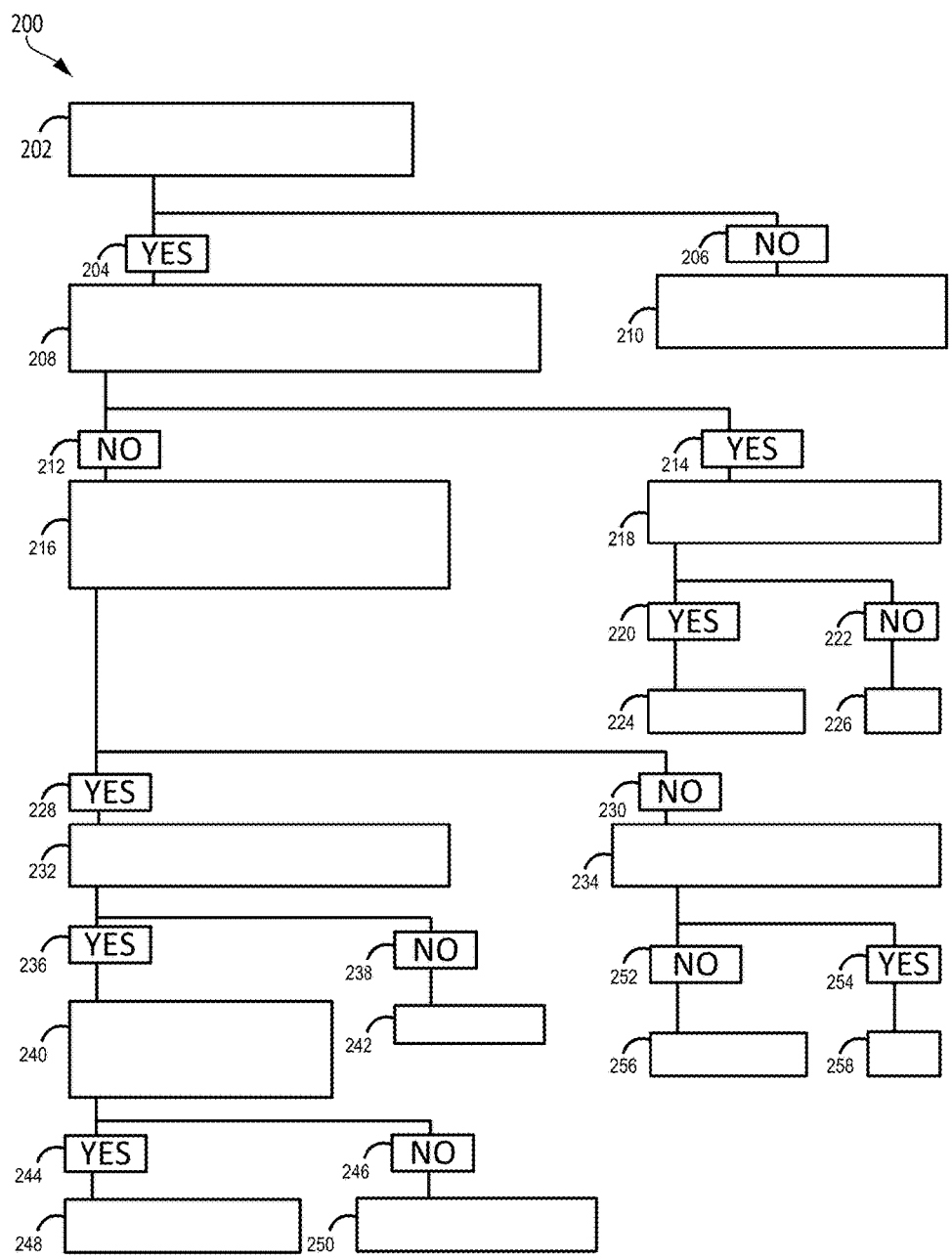
FIG. 2 illustrates a diagnostic flowchart, in accordance with an example implementation.

FIG. 2 illustrates a diagnostic flowchart 200, in accordance with an example implementation. The diagnostic flowchart 200 may include path blocks or elements 202, 208, 210, 216, 218, 224, 226, 232, 234, 240, 242, 248, 250, 256, and 258. Additionally, the diagnostic flowchart 200 may include decision elements 204, 206, 212, 214, 220, 222, 228, 230, 226, 238, 244, 246, 252, and 254. As illustrated, each decision element could lead to one or more path elements.

The diagnostic flowchart 200 could be associated with a vehicle repair issue. Further, the diagnostic flowchart 200 could be associated with a vehicle model or and/or a specific car part. In an example, the diagnostic flowchart could be associated with a DTC. For instance, the diagnostic flowchart 200 could be associated with DTC 41. DTC 41 could be indicative of a problem with the ignition control (IC)

circuit. Accordingly, the diagnostic flowchart 200 could include one or more diagnostic processes to diagnose the problem with the IC circuit. In an example, the diagnostic flowchart 200 may be associated with resolving a vehicle repair issue that is specific to a particular geographic location.

A path element (e.g., the path element 202) of the diagnostic flowchart 200 could include a diagnostic step. A diagnostic step could be performed or executed by a technician (e.g., the technician 104) responsible for the repair of the subject vehicle (e.g., the vehicle 102). Additionally or alternatively, a diagnostic step could be performed by an electronic repair tool (e.g., the diagnostic computing device 106). The diagnostic step could also be performed by a measurement tool.

After completing the steps of a path element, the flowchart 200 could lead to a decision element that is indicative of a response to a prompt of the path element. The response to the prompt may depend on a measurement made or on a property determined in a path element that leads to the decision element. In some examples, the prompt may require an answer from a technician. The technician could indicate the response by selecting a decision element. In another example, the technician could provide a response, such as a measurement, to the prompt. A decision element could be selected based on the response provided by the technician.

As illustrated in FIG. 2, the path element 202 is the first path element of the diagnostic flowchart 200. The path element 202 could include one or more diagnostic steps. For example, the path element could include two diagnostic steps: 1) Clear DTC(s), and 2) Crank engine for 15 seconds. The path element 202 could also include a prompt: "Is the DTC 41 set?" The next path element in the diagnostic process could depend on the decision element chosen in response to the prompt of path element 202.

If the decision element 206 (i.e., "NO") is chosen, the next path element in the diagnostic process could be path element 210. The path element 210 could include the diagnostic step or identification/resolution of the vehicle repair issue: "DTC 41 is intermittent. Refer to 'diagnostic aids'." Further, the path element 210 could be the final path element in the diagnostic process. For example, a diagnostic process could include the path element 202, the decision element 206, and the path element 210. In such an example, the path element 202 could be the first path element and the path element 210 could be the final path element of the diagnostic process.

Alternatively, if the decision element 204 (i.e., "YES") is chosen, the next path element in the diagnostic process could be the path element 208. As an example, the path element 208 could include four diagnostic steps: "1) Ignition 'off.' 2) Disconnect ignition coil module connector. 3) Probe ignition coil module harness connector terminal B' with a voltmeter to ground. 4) Ignition 'on.'" The path element 208 could also include a prompt: "Is more than 0.5 volts present?" The next path element in the diagnostic process could depend on the decision element chosen in response to the prompt of the path element 208. If the decision element 214 (i.e., "YES") is chosen, the next path element in the diagnostic process could be the path element 218. Alternatively, if the decision element 212 (i.e., "NO") is chosen, the next path element in the diagnostic process could be the path element 216.

As an example, the path element 218 could include three diagnostic steps: "1) Ignition 'off.' 2) Disconnect ECM connector 'A'. 3) Ignition 'on.'" The path element 218 could also include a prompt: "Is there a voltage present?" The next path element in the diagnostic process could depend on the decision element chosen in response to the prompt of the path element 218. If the decision element 220 (i.e., "YES") is chosen, the next path element in the diagnostic process could be the path element 224. Alternatively, if the decision element 222 (i.e., "NO") is chosen, the next path element in the diagnostic process could be the path element 226.

As an example, the path element 224 could include a single diagnostic step or identification/resolution of the vehicle repair issue: "1) Short to voltage in IC circuit." The path element 224 could also be the final path element in a diagnostic process. Such a diagnostic process could include the path elements 202, 208, 218, and 224. This diagnostic process could also include the decision elements 204, 214, and 220.

Returning to the path element 218, if the decision element 222 (i.e., "NO") is chosen in response to the prompt question of the path element 218, the next path element in the diagnostic process could be the path element 226. As an example, the path element 226 could include a single diagnostic step or identification/resolution of the vehicle repair issue: "1) Faulty ECM." The path element 226 could also be the final path element in a diagnostic process. Such a diagnostic process could include the path elements 202, 208, 218, and 226. The diagnostic process could also include the decision elements 204, 214, and 222.

Returning to the path element 208, if the decision element 212 (i.e., "NO") is chosen, the next path element in the diagnostic process could be the path element 216. As an example, the path element 216 could include a single diagnostic step: "1) With voltmeter on AC scale, crank engine and observe voltage." The path element 216 could also include a prompt: "Is voltage between 1 and 4 volts?" The next path element in the diagnostic process could depend on the decision element chosen in response to the prompt of the path element 216. If the decision element 228 (i.e., "YES") is chosen, the next path element in the diagnostic process could be the path element 232. Alternatively, if the decision element 230 (i.e., "NO") is chosen, the next path element in the diagnostic process could be the path element 234.

As an example, the path element 234 could include three diagnostic steps: "1) Ignition 'off.' 2) Disconnect ECM connector 'A'. 3) Check for continuity between ECM connector terminal "A12" and ignition coil module connector terminal 'B'." The path element 234 could also include a prompt: "Is the circuit open?" The next path element in the diagnostic process could depend on the decision element chosen in response to the prompt of the path element 234. If the decision element 252 (i.e., "NO") is chosen, the next path element in the diagnostic process could be the path element 256. Alternatively, if the decision element 254 (i.e., "YES") is chosen, the next path element in the diagnostic process could be the path element 258.

As an example, the path element 256 could include a single diagnostic step or identification/resolution of the vehicle repair issue: "1) Faulty ECM connection or faulty ECM." The path element 256 could also be the final path element in a diagnostic process. Such a diagnostic process could include the path elements 202, 208, 216, 234, and 256. The diagnostic process could also include the decision elements 204, 212, 230 and 252.

As an example, the path element 258 could include a single diagnostic step or identification/resolution of the vehicle repair issue: "1) Open IC circuit between ECM and ignition coil module." The path element 258 could also be the final path element in a diagnostic process. Such a diagnostic process could include the path elements 202, 208, 216, 234, and 258. The diagnostic process could also include decision elements 204, 212, 230 and 254.

Returning to the path element 216, if the decision element 228 (i.e., "YES") is chosen, the next path element in the diagnostic process could be the path element 232. As an example, the path element 232 could include two diagnostic steps: "1) Ignition 'off.' 2) With test light to B+, probe ignition coil module harness connector terminal 'C.' Light should be on." The path element 228 could also include a prompt: "Is the light on?" The next path element in the diagnostic process could depend on the decision element chosen in response to the prompt of the path element 232. If the decision element 236 (i.e., "YES") is chosen, the next path element in the diagnostic process could be the path element 240. Alternatively, if the decision element 238 (i.e., "NO") is chosen, the next path element in the diagnostic process could be the path element 242.

As an example, the path element 242 could include a single diagnostic step: "1) Open ignition coil module ground circuit." The path element 242 could also be the final path element in a diagnostic process. Such a diagnostic process could include the path elements 202, 208, 216, 232, and 242. The diagnostic process could also include the decision elements 204, 212, 228 and 238.

The path element 240 could include two diagnostic steps: "1) Ignition 'on.' 2) With test light to ground, probe ignition coil module harness connector terminals 'D' and 'A.' Light should be on both." As an example, the path element 240 could also include a prompt: "1) Is the light on both?" The next path element in the diagnostic process could depend on the decision element chosen in response to the prompt of the path element 240. If the decision element 244 (i.e., "YES") is chosen, the next path element in the diagnostic process could be the path element 248. Alternatively, if the decision element 246 (i.e., "NO") is chosen, the next path element in the diagnostic process could be the path element 250.

As an example, the path element 250 could include a single diagnostic step or identification/resolution of the vehicle repair issue: "1) Faulty circuit from ignition coil to ignition coil module on circuit that did not light." The path element 250 could also be the final path element in a diagnostic process. Such a diagnostic process could include the path elements 202, 208, 216, 232, 240, and 250. The diagnostic process could also include the decision elements 204, 212, 228, 236, and 246.

The path element 248 could include a single diagnostic step or identification/resolution of the vehicle repair issue: "1) Faulty ignition coil module connection or faulty ignition module." The path element 248 could also be the final path element in a diagnostic process. In such an example, the diagnostic process could include the path elements 202, 208, 216, 232, 240, and 248. The diagnostic process also could also include the decision elements 204, 212, 228, 236, and 244.

The diagnostic flowchart 200 could include identifiers that could be used to identify the diagnostic flowchart 200. For example, the diagnostic flowchart 200 could include a manufacturer identifier, an identifier of a vehicle problem (e.g., faults (perceived or real) complaints, DTC, etc.), and/or an identifier of a vehicle model and/or part. The diagnostic flowchart 200 could also include information indicative of a geographic region with which the diagnostic flowchart 200 could be associated.

The diagnostic flowchart 200 and the accompanying description presented herein are for illustrative purposes only and should not be considered limiting. For example, a diagnostic flowchart could be associated with any DTC and/or vehicle repair issue. As another example, the number of path elements and decision elements in a diagnostic flowchart could be less than or greater than the number of path elements and decision elements illustrated in FIG. 2.

As another example, the description of the diagnostic flowchart 200 includes examples of some diagnostic processes that are included in the diagnostic flowchart 200. The diagnostic flowchart 200 could include other diagnostic processes. For example, a diagnostic process could include path elements and decision elements of the diagnostic flowchart 200 that are chosen in a different order than the order in which the path elements of the diagnostic processes described herein are chosen.

The diagnostic flowchart 200 could include a computer-readable diagnostic flowchart. The computer-readable diagnostic flowchart could be arranged as a structured query language (SQL) file, an extensible markup language (XML) file, or some other type of computer-readable file or data structure. Accordingly, a processor of the server 108, the diagnostic computing device 106, or the technical assistance computing device 112 could search the text, symbols or other content on the diagnostic flowchart 200. Further, the diagnostic flowchart 200 could be displayed on a display of a user interface of the diagnostic computing device 106 and/or the technical assistance computing device 112.

As mentioned above, the diagnostic flowchart 200 may be color-coded to indicate the path followed by the technician 104, i.e., the path elements and decisions executed by the technician 104. For instance, the path followed by the technician 104 may be colored or presented in a bright manner on a display of the diagnostic computing device 106, and possibly simultaneously on a display of the technical assistance computing device 112. Other paths not followed, may be greyed-out or colored in red. Also, if the technician 104 makes measurements of vehicle parameters (e.g., voltages, temperatures, etc.) and the measurements are within normal range, then a block associated with this measurement may be colored in green. In contrast, if the measurements are not within normal range, then a block associated with this measurement may be colored in red.

As described above with respect to FIG. 1, the server 108 may update the diagnostic flowchart 200 based on feedback data and technical assistance information to improve performance of the diagnostic flowchart 200. For instance, the server 108 may reorder elements of the diagnostic flowchart 200, add elements or explanations, change test parameters values, etc. Reordering elements may include, for example, changing the order in which two path elements appear in the diagnostic flowchart, or changing the order in which two decision blocks are executed. As a particular example, a first decision block may appears before a second decision block in a diagnostic flowchart, and thus the first decision block would be executed before the second decision block. Reordering the elements may include modifying the diagnostic flowchart such that the second decision block and its associated path elements prior to executing the first decision block.

IV. EXAMPLE DEVICES

Figure 3:
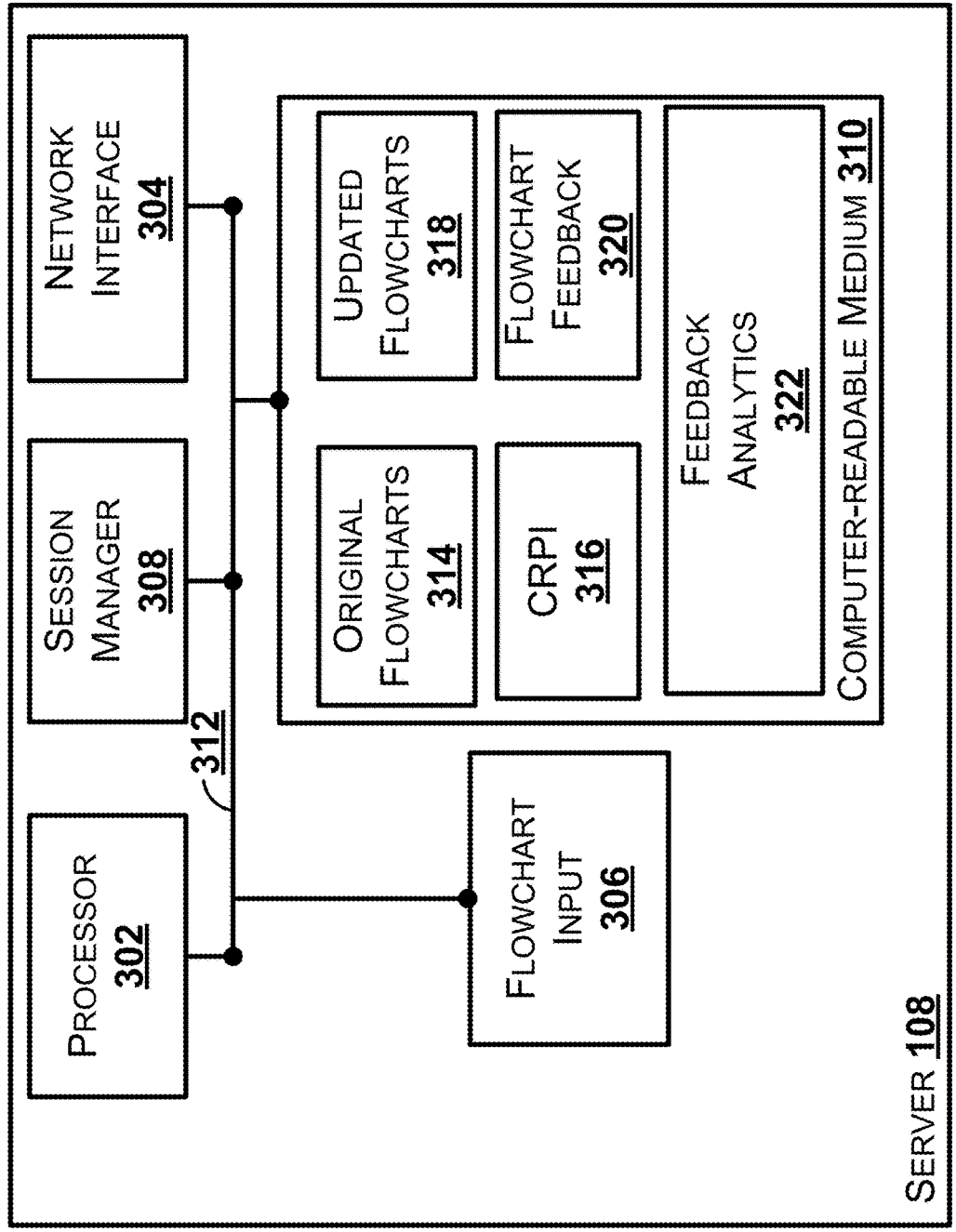
FIG. 3 illustrates a block diagram of a server, in accordance with an example implementation.

FIG. 3 illustrates a block diagram of the server 108, in accordance with an example implementation. The server 108 could include all of the components shown in FIG. 3 or any proper subset of the components shown within the server 108. The server 108 may include a processor 302, a network interface 304, a flowchart input 306, a session manager 308, and a computer-readable medium (CRM) 310.

The components of the server 108 may be communicatively coupled or linked together via a system bus, network, or other connection mechanism 312. The components shown within the server 108 could be located within a single housing or could be located remotely from each other in different housings or otherwise.

A processor such as the processor 302 or any other processor discussed in this description can comprise one or more processors. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI). A processor can be configured to execute hard-coded functionality in addition to or as an alternative to software-coded functionality (e.g., via CRPI). The at least one processor of the processor 302 can be programmed to perform any function or combination of functions described herein as being performed by the server 108.

The network interface 304 could include one or more components for communicatively coupling the server 108 to the network 110 or to a gateway that is part of or connected to the network 110 discussed above with respect to FIG. 1. As such, the network interface 304 enables the server 108 to communicate with the diagnostic computing device 106 and the technical assistance computing device 112.

The network interface 304 could include component(s) for wireless or wired communications via the network 110. The network interface 304 could include a receiver to receive the various data described as being transmitted over the network 110 to the server 108. The network interface 304 could include a transmitter to transmit the various data described as being transmitted over the network 110 to the diagnostic computing device 106 or the technical assistance computing device 112.

The flowchart input 306 could include one or more components for requesting data from a database of flowcharts, and one or more components for receiving data from the flowcharts database. The flowchart input 306 could include software modules, hardware components, or a combination thereof. In an example, the flowchart input 306 could include a server-to-database communication link or a function to be performed by the processor 302 or the network interface 304. Operations performed by the flowchart input 306 could be integrated into operations performed by the processor 302.

Original flowcharts 314 could include a database that stores diagnostic flowcharts including Original Equipment Manufacturer (OEM) flowcharts, after-market flowcharts, and/or other diagnostic flowcharts. The flowchart input 306 could include a server-to-database communication link. The processor 302 could transmit a diagnostic flowchart request received from the diagnostic computing device 106 to the flowchart input 306 and over the server-to-database communication link. The flowchart input 306 could then transmit the data it receives from the original flowcharts 314 to the processor 302.

The session manager 308 may include software modules, hardware components, or a combination thereof. For example, the session manager 308 could include a separate processor or IC. In another example, the session manager 308 could include a software module executed by the processor 302. The session manager 308 may generate a unique identifier for a diagnostic flowchart session based on the server 108 receiving a request from the diagnostic computing device 106 as described above with respect to FIG. 1. The session manager 308 may then track progress of the diagnostic session using the unique identifier.

The session manager 308 may exist in the server 108 but may also have software modules or hardware components at the diagnostic computing device 106 and/or the technical assistance computing device 112. As mentioned above, in an example, the session manager 308 may be distributed between all three entities: the server 108, the diagnostic computing device 106 and the technical assistance computing device 112.

As described above, the session manager 308 determines the state of the diagnostic flowchart session, i.e., whether the diagnostic session is active and open, inactive and open, inactive and closed, among other possible states. If a diagnostic session is not yet closed, the session manager 308 may send reminders, through the network interface 304, to the diagnostic computing device 106 and/or the technical assistance computing device 112 until feedback is received and the session is closed. Alternatively, the session manager 308 may automatically access the management system of the repair shop to obtain any feedback left by the technician 104 on the repair order as described above.

The CRM 310 or any other CRM discussed in this disclosure or included within a device or system described in this disclosure (e.g., CRM 412 discussed below), could include a non-transitory computer-readable medium, a transitory computer-readable medium, or both a non-transitory computer-readable medium and a transitory computer-readable medium. In one respect, a non-transitory computer-readable medium could be integrated in whole or in part with a processor (e.g., the processor 302). In another respect, a non-transitory computer-readable medium, or a portion thereof, could be separate and distinct from a processor.

A non-transitory computer-readable medium could include, for example, a volatile or non-volatile storage component, such as an optical, magnetic, organic or other memory or disc storage. Additionally or alternatively, a non-transitory computer-readable medium could include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium can include, for example, CRPI provided over a communication link, such as a communication link which is connected to or is part of the communication network 110. The communication link can include a digital or analog communication link. The communication link can include a wired communication link including one or more wires or conductors, or a wireless communication link including an air interface.

The CRM 310 could store a variety of data. The data stored by CRM 310 could include data that has been provided to the CRM 310 for storage from the flowchart input 306, the processor 302, or the network interface 304. The data stored in the CRM 310 could include one or more of the original flowcharts 314, CRPI 316, updated flowcharts 318, flowchart feedback 320, and feedback analytics 322.

An original flowchart of the original flowcharts 314 may include a diagnostic flowchart developed and published by a vehicle manufacturer (i.e., an OEM) or a vehicle parts manufacturer (i.e., an OEM of vehicle parts installed). Alternatively, a diagnostic flowchart could be developed and published by a diagnostic equipment manufacturer or a manufacturer of after-market vehicle parts, or a provider of vehicle service information.

In an example, the original flowcharts 314 may be searchable by keywords or repair issues. In another example, each diagnostic flowchart of the original flowcharts 314 may have a flowchart identifier that facilitates locating, archiving, and retrieving such diagnostic flowchart. The flowchart identifier may include data associated with the corresponding flowchart. For example, the flowchart identifier could include the DTC that a flowchart is designed to diagnose. In another example, the flowchart identifier could include one or more symptoms that a flowchart is designed to diagnose. In another example, the flowchart identifier may identify a vehicle model that a flowchart is designed for. A geographic location may also be associated with, or used to identify, the flowchart. Thus, the processor 302 could use identifiers as search parameters when searching for a diagnostic flowchart in the original flowcharts 314.

In an example, the processor 302 could assign a unique flowchart identifier to each diagnostic flowchart stored in the original flowcharts 314. For example, the flowchart identifier could include any numeric or alphanumeric identifier.

As described above, the server 108 may be configured to update a diagnostic flowchart based on feedback from the diagnostic computing device 106 or the technical assistance computing device 112. The updated diagnostic flowchart may then be stored in a database referred to herein as the updated flowcharts 318.

An updated flowchart could include an original flowchart that has been modified based on feedback data associated with the performance of the flowchart as received from the diagnostic computing device 106 or the technical assistance computing device 112. The updated flowchart could be more effective than the original flowchart in diagnosing and resolving a vehicle repair issue and may reduce the number of requests for technical assistance. The updated flowchart could be associated with the same flowchart identifier with which the original flowchart is associated and/or could be associated with at least one identifier indicating that the flowchart has been updated from an original flowchart.

Subsequently, a future request received at the server 108 from the diagnostic computing device 106 may result in the updated flowchart being transmitted to the diagnostic computing device 106. An updated flowchart may repeatedly be updated based on feedback from multiple diagnostic sessions with multiple vehicles or shops. Each time a flowchart is updated, the previous version may be replaced, or multiple updated versions could be stored to keep track of the history a particular flowchart.

Further, in some examples, more than one updated version of a diagnostic flowchart could exist. As explained above, a particular vehicle repair issue may be unique to or associated with a particular geographic region. For example, the particular vehicle repair issue could be attributed to a disparity in weather conditions, elevations, etc. between different geographic regions. The server 108 could thus receive different feedback data for the same flowchart from diagnostic computing devices located at different geographic regions.

Thus, the processor 302 could generate different updated versions of the flowchart for respective different geographic regions (e.g., Midwest region versus Southeast region of the United States, different continents, Asia versus Europe, different States of the United States, etc.). The server 108 could also determine the geographic location of the diagnostic computing device 106 from location information included within a diagnostic flowchart request, and then associate any updates with that geographic location.

In an example, the original flowcharts 314 could be separate from the updated flowcharts 318 as shown in FIG. 3. However, in another example, both the original flowcharts 314 and the updated flowcharts 318 could be merged into a single database that is updated overtime to improve effectiveness of the flowcharts in identifying and fixing vehicle repair issues.

The processor 302 may analyze the flowchart feedback 320 obtained from the diagnostic computing device 106 and/or the technical assistance computing device 112 to generate the feedback analytics 322. Each diagnostic flowchart stored in the CRM 310 could be associated with respective analytical data. The analytical data associated with a diagnostic flowchart could include a selection statistic for one or more path elements and/or decision elements of the diagnostic flowchart. The selection statistic could represent the number of times that an element of the diagnostic flowchart was selected during performances of the diagnostic flowchart. The analytical data could also include data indicative of the success rate of a diagnostic process. The success rate could be indicative of the success of a diagnostic flowchart in diagnosing a vehicle repair issue.

The CRPI 316 could include program instructions executable by the processor 302 to perform the operations of the server 108 as discussed above with respect to FIGS. 1 and 3.

Figure 4:
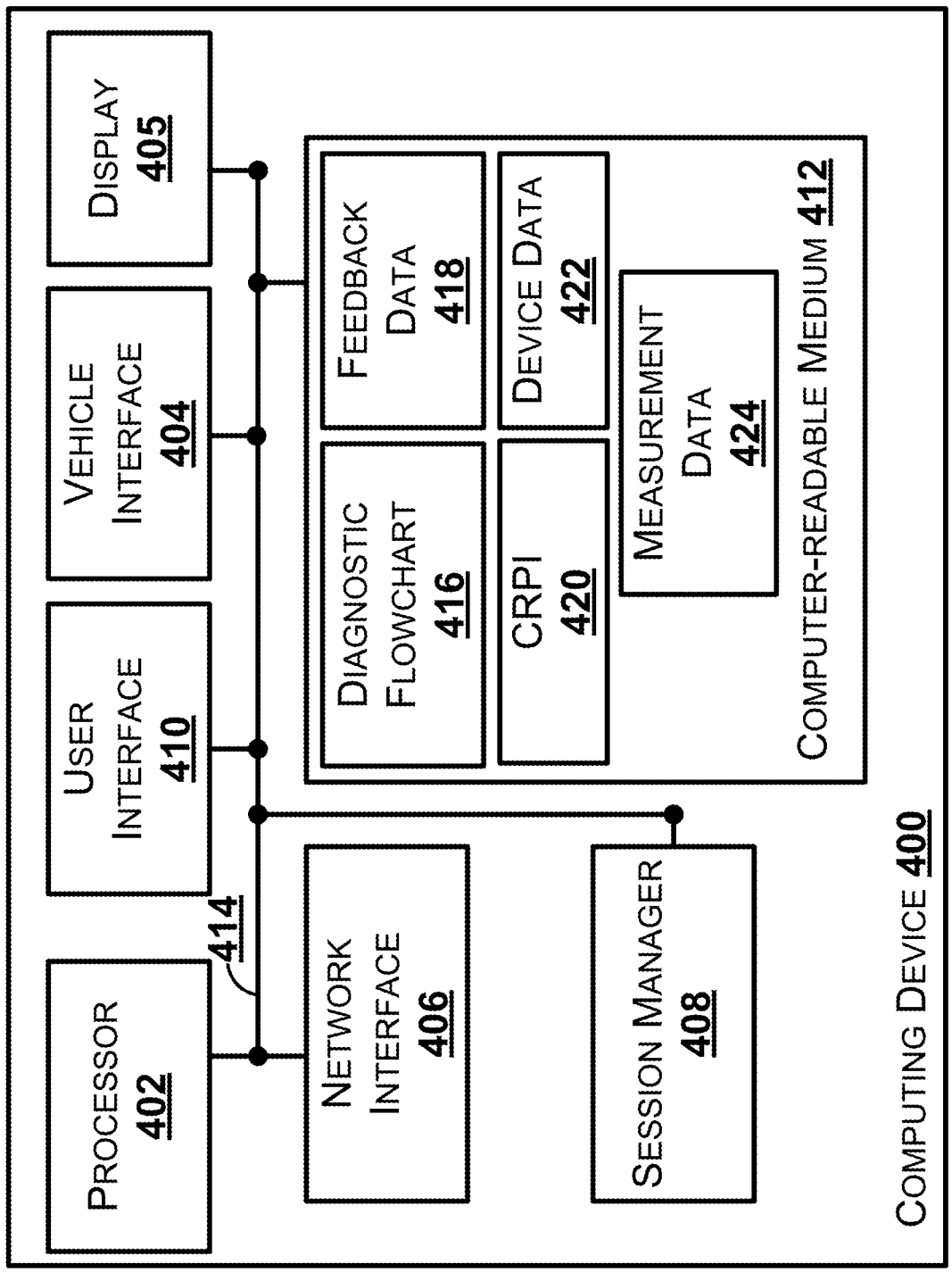
FIG. 4 illustrates a block diagram of a computing device, in accordance with an example implementation.

FIG. 4 illustrates a block diagram of a computing device 400, in accordance with an example implementation. The computing device 400 may represent either the diagnostic computing device 106 or the technical assistance computing device 112, and may be configured to execute the operations described at FIG. 1 with respect to either device.

The computing device 400 could include all of the components shown in FIG. 4 or any proper subset of these components. For example, if the computing device 400 represents the diagnostic computing device 106, the computing device 400 could include a processor 402, a vehicle interface 404, a display 405, a network interface 406, a session manager 408, a user interface 410, and a CRM 412. If the computing device 400 represents the technical assistance computing device 112, then the computing device 400 may include the processor 402, the display 405, the network interface 406, the session manager 408, the user interface 410, and the CRM 412, for example.

The components of the computing device 400 may be communicatively coupled or linked together via a system bus, network, or other connection mechanism 414. The components shown within the computing device 400 could be located within a single housing, or located remotely from each other in different housings or otherwise.

The processor 402 may include one or more general purpose processors or one or more special purpose processors (e.g., digital signal processors or graphics processors). The CRM 412 may include or store diagnostic flowchart 416, feedback data 418, CRPI 420, device data 422, and measurement/sensor data 424. Other examples of computer-readable elements stored within the CRM 412 are also possible.

The diagnostic flowchart 416 may be similar to the diagnostic flowchart 200, and may be received from the server 108 (e.g., from the original flowcharts 314 or updated flowcharts 318). The diagnostic flowchart 416 may thus include a decision tree flowchart that includes diagnostic processes that identify and resolve a vehicle repair issue.

The feedback data 418 could contain feedback data that results from performing the diagnostic steps of a diagnostic process. Elements of the feedback data could include data indicative of the path elements performed, decision elements selected, diagnostic steps performed, measurements performed, success of a diagnostic process, and/or time associated with performing elements of the diagnostic flowchart 416. Other parameters could also be stored in the feedback data 418 such as experience level of the technician 104 performing or overseeing the performance of the diagnostic flowchart 416.

In an example, the feedback data 418 may include a version of the diagnostic flowchart 416 that facilitates informing the technical assistant 114 with how the technician 104 has executed the diagnostic flowchart 416. The feedback data 418 may also include the technical or diagnostic assistance information provided by the technical assistance computing device 112 to the diagnostic computing device 106 to further assist in identifying and resolving the vehicle repair issue.

The data stored in the feedback data 418 could be transmitted by the network interface 406 to the flowchart feedback 320 of the server 108. The server 108 may then use this feedback data 418 to update the diagnostic flowchart as described above.

As mentioned above, if the computing device 400 represents the diagnostic computing device 106, it may include the vehicle interface 404. The vehicle interface 404 could include one or more components for communicatively coupling the computing device 400 to the vehicle 102 over a communication link. For instance, the vehicle interface 404 may "tap" into a Controller Area Network (CAN) bus of the vehicle 102 to obtain access to sensor information and other data generated within the vehicle 102. The vehicle interface 404 enables the computing device 400 to transmit and receive data to and from the vehicle 102.

The network interface 406 could include one or more components for communicatively coupling the computing device 400 to the network 110 or to a gateway that is part of or connected to the network 110. The network interface 406 could include component(s) for wireless or wired communications via the network 110.

The session manager 408 may include a software module, hardware components, or a combination thereof, and may be in communication with the session manager 308 of the server 108. The session manager 408 may thus provide reminders or notification as long as the diagnostic session is still open. The reminders could be displayed on the display 405 for example.

The user interface 410 may include a graphical user interface (GUI) to be displayed on the display 405. For instance, the processor 402 may generate a display of the diagnostic flowchart 416 on the user interface 410 to enable the technician 104 or the technical assistant 114 to see the flowchart and interact with it.

The technician 104 or the technical assistant 114 could input information to the computing device 400 through the GUI. As an example, the GUI could include displayable features comprising vehicle symptoms and vehicle characteristics selectable for generating a request for a diagnostic flowchart. As another example, the GUI could provide a way to enter measurements obtained by the technician 104.

As yet another example, the GUI could be configured for a user to input a selection of a decision element or a path element of the diagnostic flowchart 416. The selection of a path element could indicate the performance of the path element. Accordingly, the user interface 410 could include user-input elements configured so that a user (e.g., the technician 104) of computing device 400 could input data for use by the processor 402. The GUI could include other forms of visually-presentable data as well.

Each of the diagnostic computing device 106 and the technical assistance computing device 112 may include a respective display 405. The display 405 of each of both devices may simultaneously display common information such that the technician 104 and the technical assistant 114 may be able to see the same information. For instance, the processor 402 of each device may generate a display of the same diagnostic flowchart 416.

The CRPI 420 includes program instructions executable by the processor 402 to enable the computing device 400 to perform the operations discussed herein with respect to the diagnostic computing device 106 or the technical assistance computing device 112.

The device data 422 could include an identifier (e.g., a serial number) of the computing device 400, a geographic location in which the computing device 400 is installed and/or operational, etc. For instance, the geographic location could include GPS coordinates of the location. If the computing device 400 represents the diagnostic computing device 106, the device data 422 including the geographic location could be transmitted along with the request for diagnostic flowchart to the server 108, and the server 108 may select the diagnostic flowchart based on the geographic location.

The measurement data 424 may include sensor or other measurements that result from performing a diagnostic step. The measurement data 424 may, for example, be obtained through the vehicle interface 404. The measurement data 424 may be communicated between the computing device 400 and other entities, such as the server 108, or another computing device 400.

V. EXAMPLE METHODS

Figure 5:
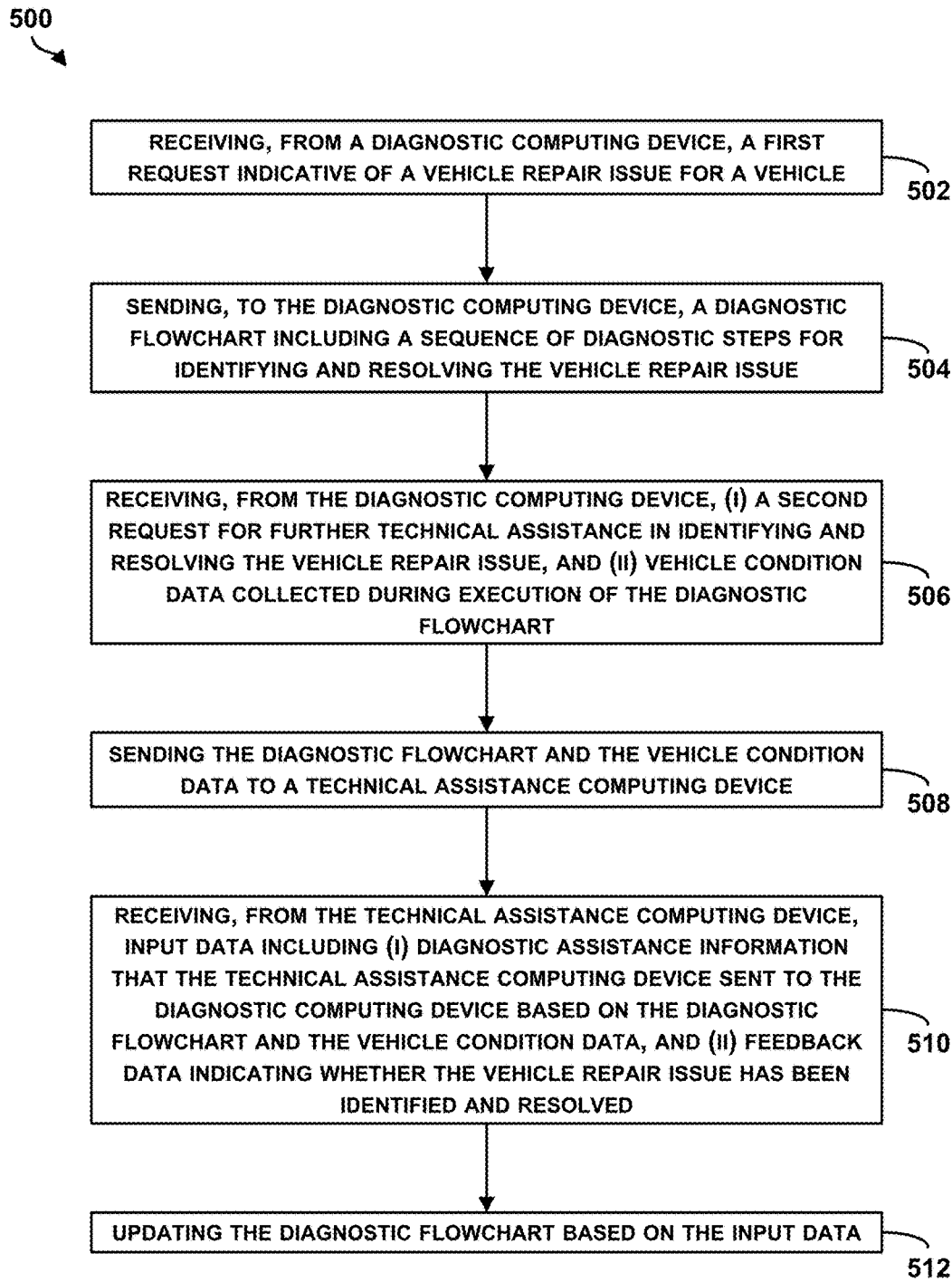
FIG. 5 illustrates a method performed by a computing server, in accordance with an example implementation.

FIG. 5 illustrates a method 500 performed by a computing server, in accordance with an example implementation. The computing server could include the server 108 discussed above, for example. The method 500 may include one or more operations, or actions as illustrated by one or more of blocks 502-512. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, the method 500 shows operation of one possible implementation of present examples. In this regard, each block may represent a module, a segment, or a portion of program code, which includes one or more instructions executable by a processor (e.g., 302) or a controller for implementing specific logical operations or steps in the process. The program code may be stored on any type of computer readable medium or memory (e.g., the CRM 310), for example, such as a storage device including a disk or hard drive. In addition, for the method 500 and other processes and operations disclosed herein, one or more blocks in FIG. 5 may represent circuitry or digital logic that is arranged to perform the specific logical operations in the process.

At block 502, the method 500 includes receiving, from a diagnostic computing device, a first request indicative of a vehicle repair issue for a vehicle. As described above, a user or a technician may be tasked with repairing a vehicle experiencing a particular vehicle repair issue. The technician may be using a diagnostic computing device (106 or 400) to assist the technician in repairing the vehicle. The technician may submit a request to a server to obtain help with repairing the vehicle. The request may include symptoms of the vehicle, a DTC, or any other information indicative of the vehicle repair issue that the vehicle is experiencing. In an example, the request may further indicate or include data indicating a geographic location related to a current or prior location of the vehicle (e.g., location where the vehicle was manufactured or operated, a location of the shop where the technician is repairing the vehicle, etc.).

In an example, the server receives this request and, in response, the server may initiate a diagnostic flowchart session. The server may also generate an identifier for the diagnostic flowchart session. This identifier may facilitate all communications, present and future, that are associated with this particular diagnostic flowchart session.

At block 504, the method 500 includes sending, to the diagnostic computing device, a diagnostic flowchart including a sequence of diagnostic steps for identifying and resolving the vehicle repair issue. The server may have access to a database including original flowcharts (e.g., the original flowcharts 314) and may select or identify a diagnostic flowchart associated with repairing the vehicle repair issue indicated by the request from the diagnostic computing device.

As discussed above with respect to the diagnostic flowchart 200, the diagnostic flowchart may include a sequence of ordered and performable path elements. Each path element leads to one or more decision elements, and wherein each path element comprises one or more of the diagnostic steps.

In an example, the server may select the diagnostic flowchart based on the geographic location in addition to the vehicle repair issue. Particularly, the diagnostic flowchart may be selected to be specific to the vehicle repair issue as experienced by other vehicles at the geographic location related to the current or prior location of the vehicle.

At block 506, the method 500 includes receiving, from the diagnostic computing device, (i) a second request for further technical assistance in identifying and resolving the vehicle repair issue, and (ii) vehicle condition data collected during execution of the diagnostic flowchart. The technician may attempt to follow the sequence of steps of the diagnostic flowchart to repair the vehicle, but in some instances might not be able to identify and resolve the vehicle repair issue.

The technician may then submit another (i.e., a second) request to the server to ask for additional assistance in identifying and resolving the repair issue. During execution of the diagnostic flowchart, the technician may have collected vehicle condition data such as odometer reading of the vehicle, a DTC, a symptom of a malfunction of the vehicle, PIDs and PID values, sensor data, freeze frame data, etc. The request for further assistance may also include such vehicle condition data.

Additionally, this request for additional assistance may include or may be accompanied by more information indicative of how the technician executed the diagnostic flowchart. For instance, this information may include data indicative of execution of at least one path element of the diagnostic flowchart, one or more parameters obtained during the execution of the at least one path element, data indicative of a decision made for at least one decision element of the diagnostic flowchart, data indicative of an input from a technician executing the at least one path element, etc. As an example, the request may include or be accompanied with an annotated or color-coded diagnostic flowchart indicating such information.

In an example, the input from the technician may include supplemental information received from an authorized entity such as a vehicle manufacturer, a vehicle part manufacturer, or a vehicle service information provider. Also, the one or more parameters may include an experience level of the technician, an execution time of the at least one path element, etc. The request may further include contact information for the technician executing the diagnostic flowchart.

At block 508, the method 500 includes sending the diagnostic flowchart and the vehicle condition data to a technical assistance computing device. The server may provide the diagnostic flowchart, the vehicle condition data, and any or all of the above-mentioned additional information accompanying the request for further assistance to a technical assistance computing device (e.g., 112 or 400). The technical assistance computing device may be operated by a third-party agent or a technical assistant. The contact information that may be included in the request for further assistance may facilitate communication between the technician and the technical assistant.

In an example, the server may hand off communication or such that the diagnostic computing device may communicate directly with the technical assistance computing device. In another example, communication between the diagnostic computing device and the technical assistance computing device may flow through the server. The diagnostic computing device may provide the identifier of the diagnostic flowchart session to the technical assistance computing device. The technical assistance computing device may then use the identifier to retrieve the diagnostic flowchart, the vehicle condition data, and any or all of the above-mentioned additional information. The technical assistance computing device may then send diagnostic or technical assistance information that further assists the technician in identifying and resolving the vehicle repair issue.

The identifier of the diagnostic flowchart session may facilitate displaying common information simultaneously at respective displays of the diagnostic computing device and the technical assistance computing device. The common information may include the diagnostic flowchart, the vehicle condition data, the diagnostic assistance information that the technical assistance computing device sent, etc. The technician may implement instructions provided in the diagnostic assistance information, and may then send feedback data to the technical assistance computing device indicating whether the vehicle repair issue has been identified and resolved.

At block 510, the method 500 includes receiving, from the technical assistance computing device, input data including (i) diagnostic assistance information that the technical assistance computing device sent to the diagnostic computing device based on the diagnostic flowchart and the vehicle condition data, and (ii) feedback data indicating whether the vehicle repair issue has been identified and resolved. Once the repair issue is resolved, the technical assistance computing device may send the diagnostic assistance information and the feedback data to the server.

As discussed above, the server may monitor state of the outstanding repair issue and/or state of the communication between the technical assistance computing device and the diagnostic computing device. If the server does not receive feedback data, the server may periodically send a notification to either or both of the diagnostic computing device and the technical assistance computing device until the feedback data is received. Once feedback is received, the server may switch the state to inactive and closed.

At block 512, the method 500 includes updating the diagnostic flowchart based on the input data. The server may modify the diagnostic flowchart based on the diagnostic assistance information and the feedback data so as to improve performance of the diagnostic flowchart. The server may store the updated diagnostic flowchart and provide the updated flowchart when the server receives future requests for similar vehicle repair issues.

Figure 6:
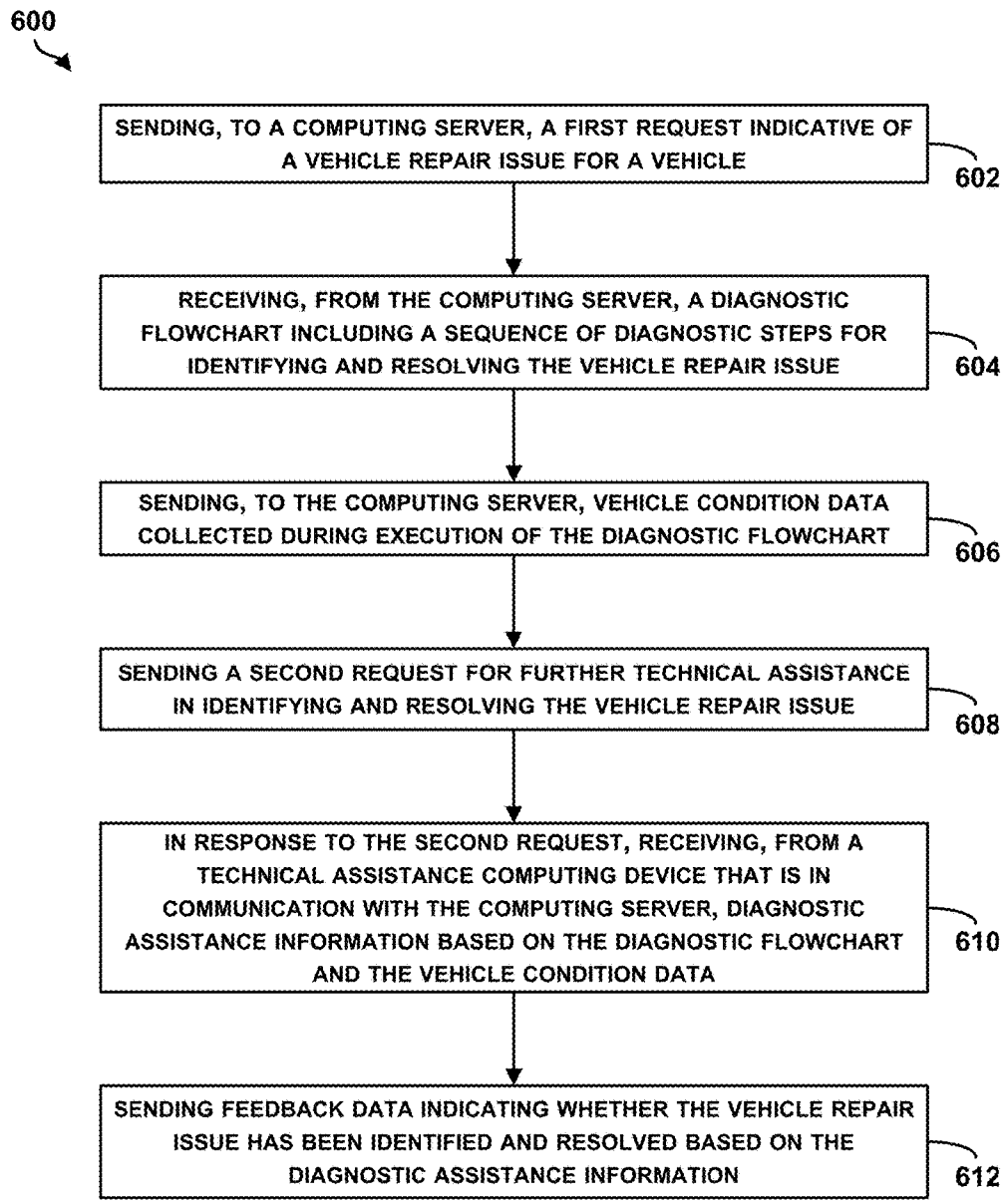
FIG. 6 illustrates a method performed by a diagnostic computing device, in accordance with an example implementation.

FIG. 6 illustrates a method 600 performed by a diagnostic computing device, in accordance with an example implementation. The diagnostic computing device could include the diagnostic computing device 106 or the computing device 400 discussed above. The method 600 may include one or more operations, or actions as illustrated by one or more of blocks 602-612. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, the method 600 shows operation of one possible implementation of present examples. In this regard, each block may represent a module, a segment, or a portion of program code, which includes one or more instructions executable by a processor (e.g., 402) the processor or a controller for implementing specific logical operations or steps in the process. The program code may be stored on any type of computer readable medium or memory (e.g., the CRM 412), for example, such as a storage device including a disk or hard drive. In addition, for the method 600 and other processes and operations disclosed herein, one or more blocks in FIG. 6 may represent circuitry or digital logic that is arranged to perform the specific logical operations in the process.

At block 602, the method 600 includes sending, to a computing server, a first request indicative of a vehicle repair issue for a vehicle. A diagnostic computing device may send this request to a server to obtain a diagnostic flowchart. The server may accordingly initiate a diagnostic flowchart session and assign an identifier for the session.

At block 604, the method 600 includes receiving, from the computing server, a diagnostic flowchart including a sequence of diagnostic steps for identifying and resolving the vehicle repair issue.

At block 606, the method 600 includes sending, to the computing server, vehicle condition data collected during execution of the diagnostic flowchart.

At block 608, the method 600 includes sending a second request for further technical assistance in identifying and resolving the vehicle repair issue. In an example, the diagnostic computing device may send this second request to the server. In this example, the server may provide the diagnostic flowchart, the vehicle condition data, and any other relevant information to a technical assistance computing device.

In another example, the diagnostic computing device may send the second request directly to the technical assistance computing device along with the identifier of the session. The identifier enables the technical assistance computing device to retrieve the diagnostic flowchart, the vehicle condition data, and any relevant information from the server. The identifier may also facilitate displaying, simultaneously on a display at the diagnostic computing device and on a display at the technical assistance computing device, the diagnostic flowchart and the vehicle condition data during the diagnostic flowchart session.

At block 610, the method 600 includes, in response to the second request, receiving, from a technical assistance computing device that is in communication with the computing server, diagnostic assistance information based on the diagnostic flowchart and the vehicle condition data.

At block 612, the method 600 includes sending feedback data indicating whether the vehicle repair issue has been identified and resolved based on the diagnostic assistance information. In an example, the diagnostic computing device may send the feedback data and the diagnostic assistance information directly to the server. In another example, the diagnostic computing device may send the feedback data to the technical assistance computing device, which may then provide the feedback data and the diagnostic assistance information to the server. The server may then update the diagnostic flowchart based on the feedback data and the diagnostic assistance information. In examples, the server might not update the diagnostic flowchart based on one diagnostic flowchart session that results in modification to the diagnostic flowchart. For instance, such modification may be specific to a condition of a particular vehicle (e.g., a vehicle that just had an accident) as opposed to being generally applicable to all vehicles experiencing an associated vehicle repair issue. In these examples, the server update or modify the diagnostic flowchart (e.g., modify a path element) if such modification has been successful more than a threshold number of times (e.g., 1 or 2 times) in resolving a particular vehicle repair issue.

Figure 7:
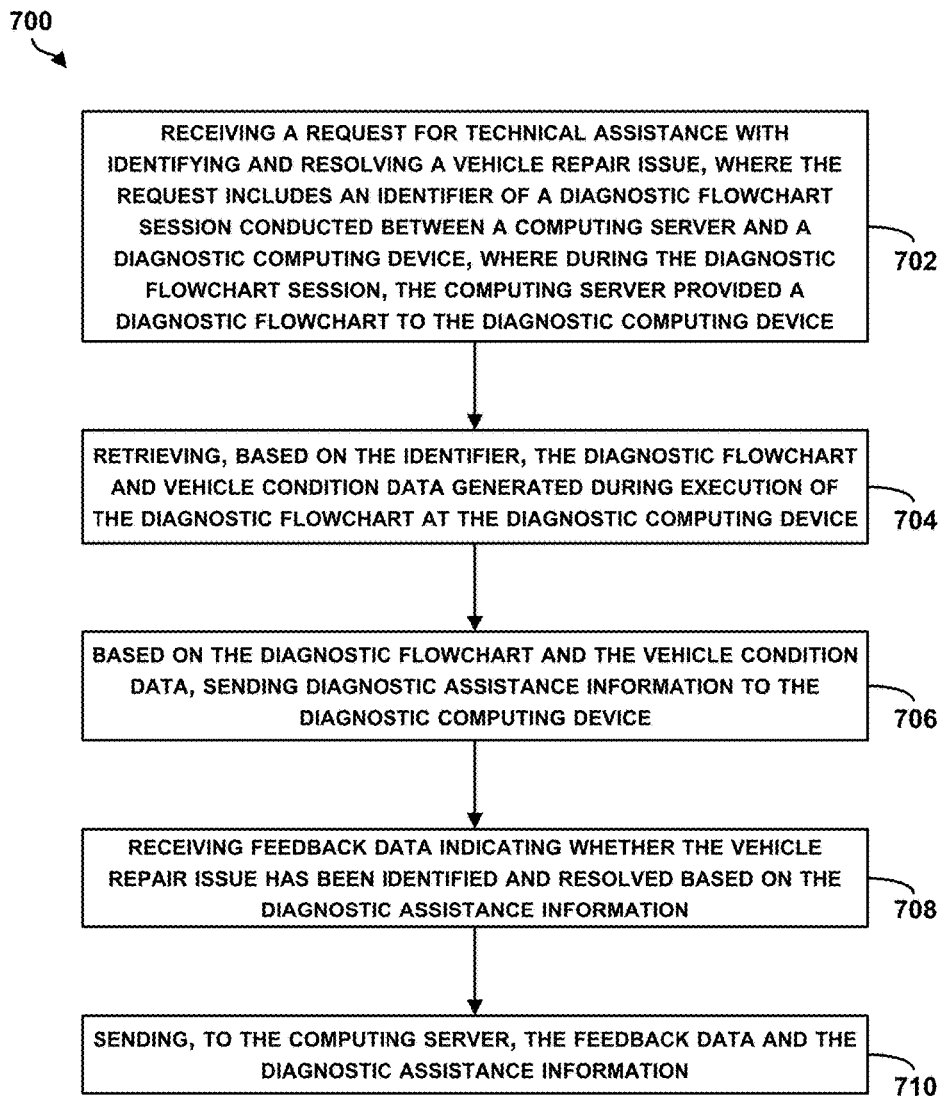
FIG. 7 illustrates a method performed by a technical assistance computing device, in accordance with an example implementation.

FIG. 7 illustrates a method 700 performed by a technical assistance computing device, in accordance with an example implementation. The technical assistance computing device could include the technical assistance computing device 112 or the computing device 400 discussed above. The method 700 may include one or more operations, or actions as illustrated by one or more of blocks 702-710. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, the method 700 shows operation of one possible implementation of present examples. In this regard, each block may represent a module, a segment, or a portion of program code, which includes one or more instructions executable by a processor (e.g., 402) the processor or a controller for implementing specific logical operations or steps in the process. The program code may be stored on any type of computer readable medium or memory (e.g., the CRM 412), for example, such as a storage device including a disk or hard drive. In addition, for the method 700 and other processes and operations disclosed herein, one or more blocks in FIG. 7 may represent circuitry or digital logic that is arranged to perform the specific logical operations in the process.

At block 702, the method 700 includes receiving a request for technical assistance with identifying and resolving a vehicle repair issue. The technical assistance computing device may receive the request from either a computing server or a diagnostic computing device. The request includes an identifier of a diagnostic flowchart session conducted between the computing server and the diagnostic computing device. During the diagnostic flowchart session, the computing server has provided a diagnostic flowchart to the diagnostic computing device.

At block 704, the method 700 includes retrieving, based on the identifier, the diagnostic flowchart and vehicle condition data generated during execution of the diagnostic flowchart at the diagnostic computing device. The technical assistance computing device may use the identifier to retrieve the diagnostic flowchart, the vehicle condition data, and other information from the computing server or the diagnostic computing device.

At block 706, the method 700 includes, based on the diagnostic flowchart and the vehicle condition data, sending diagnostic assistance information to the diagnostic computing device. The diagnostic assistance information includes technical assistance information that further assists a technician to identify and resolve the vehicle repair issue.

At block 708, the method 700 includes receiving feedback data indicating whether the vehicle repair issue has been identified and resolved based on the diagnostic assistance information. The technical assistance computing device receives the feedback data from the diagnostic computing device. For instance, the technician inputs information (e.g., inputs text, selects a menu item from a drop-down menu, etc.) indicating whether the technician successfully resolved the repair issue using the diagnostic assistance information. This feedback is then transmitted and received at the technical assistance computing device.

At block 710, the method 700 includes sending, to the computing server, the feedback data and the diagnostic assistance information. The technical assistance computing device may send the feedback data to the server, and the server may accordingly update the diagnostic flowchart.

VI. CONCLUSION

It should be understood that arrangements described herein are for purposes of example only. As such, those skilled in the art will appreciate that other arrangements and other elements (e.g., machines, interfaces, orders, and groupings of operations, etc.) could be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

Embodiments of the present disclosure may thus relate to one of the enumerated example embodiments (EEEs) listed below.

EEE 1 is a method performed by a computing server, the method comprising: receiving, from a diagnostic computing device, a first request indicative of a vehicle repair issue for a vehicle; sending, to the diagnostic computing device, a diagnostic flowchart including a sequence of diagnostic steps for identifying and resolving the vehicle repair issue; receiving, from the diagnostic computing device, (i) a second request for further technical assistance in identifying and resolving the vehicle repair issue, and (ii) vehicle condition data collected during execution of the diagnostic flowchart; sending the diagnostic flowchart and the vehicle condition data to a technical assistance computing device; receiving, from the technical assistance computing device, input data including (i) diagnostic assistance information that the technical assistance computing device sent to the diagnostic computing device based on the diagnostic flowchart and the vehicle condition data, and (ii) feedback data indicating whether the vehicle repair issue has been identified and resolved; and updating the diagnostic flowchart based on the input data.

EEE 2 is the method of EEE 1, further comprising: in response to receiving the first request, initiating a diagnostic flowchart session; and generating an identifier for the diagnostic flowchart session, wherein the second request further includes the identifier so as to facilitate identifying the diagnostic flowchart session.

EEE 3 is the method of EEE 2, wherein the identifier facilitates the diagnostic computing device and the technical assistance computing device displaying common information simultaneously, and wherein the common information comprises one or more of the diagnostic flowchart, the vehicle condition data, and the diagnostic assistance information.

EEE 4 is the method of any one of EEE 1 to 3, wherein the second request further includes contact information for a technician executing the diagnostic flowchart.

EEE 5 is the method of any one of EEE 1 to 4, wherein the vehicle condition data collected during execution of the diagnostic flowchart includes one or more of (i) odometer reading of the vehicle, (ii) a diagnostic trouble code (DTC), (iii) a symptom of a malfunction of the vehicle, (iv) Parameter IDs (PIDs) and PID values, (v) sensor data, and (vi) freeze frame data.

EEE 6 is the method of any one of EEE 1 to 5, wherein the diagnostic flowchart comprises one or more ordered and performable path elements, wherein each path element leads to one or more decision elements, and wherein each path element comprises one or more of the diagnostic steps.

EEE 7 is the method of EEE 6, wherein the second request further includes at least one of: (i) data indicative of execution of at least one path element of the diagnostic flowchart, (ii) one or more parameters obtained during the execution of the at least one path element, (iii) data indicative of a decision made for at least one decision element of the diagnostic flowchart, and (iv) data indicative of an input from a technician executing the at least one path element.

EEE 8 is the method of EEE 7, wherein the input from the technician includes supplemental information received from an authorized entity, wherein the authorized entity is one of: (i) a vehicle manufacturer, (ii) a vehicle part manufacturer, or (iii) a vehicle service information provider.

EEE 9 is the method of EEE 7 or 8, wherein the one or more parameters comprise at least one of: (i) an experience level of the technician, and (ii) an execution time of the at least one path element.

EEE 10 is the method of any one of EEE 1 to 9, wherein the first request is further indicative of a geographic location related to a current or prior location of the vehicle, and wherein the method further comprises: selecting the diagnostic flowchart based at least in part on the geographic location, wherein the diagnostic flowchart is specific to the vehicle repair issue as experienced by other vehicles at the geographic location related to the current or prior location of the vehicle.

EEE 11 is the method of any of EEE 1 to 10, further comprising: periodically sending a notification to one or more of the diagnostic computing device and the technical assistance computing device until the feedback data is received.

EEE 12 is a method performed by a diagnostic computing device, the method comprising: sending, to a computing server, a first request indicative of a vehicle repair issue for a vehicle; receiving, from the computing server, a diagnostic flowchart including a sequence of diagnostic steps for identifying and resolving the vehicle repair issue; sending, to the computing server, vehicle condition data collected during execution of the diagnostic flowchart; sending a second request for further technical assistance in identifying and resolving the vehicle repair issue; in response to the second request, receiving, from a technical assistance computing device that is in communication with the computing server, diagnostic assistance information based on the diagnostic flowchart and the vehicle condition data; and sending feedback data indicating whether the vehicle repair issue has been identified and resolved based on the diagnostic assistance information.

EEE 13 is the method of EEE 12, wherein sending the second request comprises sending the second request to the computing server.

EEE 14 is the method of EEE 12 or 13, wherein based on the first request, a diagnostic flowchart session is initiated and an identifier for the diagnostic flowchart session is generated, wherein sending the second request comprises sending the second request including the identifier to the technical assistance computing device so as to enable the technical assistance computing device to retrieve the diagnostic flowchart and the vehicle condition data from the computing server based on the identifier.

EEE 15 is the method of EEE 14, further comprising: displaying, simultaneously on a display at the diagnostic computing device and on a display at the technical assistance computing device, the diagnostic flowchart and the vehicle condition data during the diagnostic flowchart session.

EEE 16 is a system comprising: a computing server; a diagnostic computing device in communication with the computing server; and a technical assistance computing device in communication with the computing server and the diagnostic computing device, wherein: the diagnostic computing device sends to the computing server a first request indicative of a vehicle repair issue for a vehicle, responsively, the computing server sends to the diagnostic computing device a diagnostic flowchart including a sequence of diagnostic steps for identifying and resolving the vehicle repair issue, the diagnostic computing device sends to the computing server vehicle condition data collected during execution of the diagnostic flowchart, the diagnostic computing device sends a second request for further technical assistance in identifying and resolving the vehicle repair issue, the computing server sends the diagnostic flowchart and the vehicle condition data to the technical assistance computing device, based on the diagnostic flowchart and the vehicle condition data, the technical assistance computing device sends diagnostic assistance information to the diagnostic computing device, the diagnostic computing device sends to the technical assistance computing feedback data indicating whether the vehicle repair issue has been identified and resolved based on the diagnostic assistance information, the technical assistance computing device sends to the computing server the feedback data and the diagnostic assistance information, and the computing server updates the diagnostic flowchart based on the diagnostic assistance information and the feedback data.

EEE 17 is the system of EEE 16, wherein the diagnostic computing device sends the second request to the computing server, and wherein in response to the second request, the computing server sends the diagnostic flowchart and the vehicle condition data to the technical assistance computing device.

EEE 18 is the system of EEE 16 or 17, wherein the computing server initiates a diagnostic flowchart session and generates an identifier for the diagnostic flowchart session based on the first request, wherein: the diagnostic computing device receives the identifier from the computing server in response to sending the first request.

EEE 19 is the system of EEE 18, wherein the diagnostic computing device sends the second request to the technical assistance computing device such that the second request includes the identifier so as to enable the technical assistance computing device to retrieve the diagnostic flowchart and the vehicle condition data from the computing server based on the identifier.

EEE 20 is the system of EEE 19, further comprising: a first display coupled to the diagnostic computing device; and a second display coupled to the technical assistance computing device, wherein the diagnostic flowchart and information indicative of the vehicle condition data are simultaneously displayed on the first display and the second display after the technical assistance computing device retrieves the diagnostic flowchart and the vehicle condition data.

EEE 21 is the system of any one of EEE 16 to 20, wherein the computing server determines a state of the diagnostic flowchart session, and wherein the state is one of at least three states: a first state where the technical assistance computing device and the diagnostic computing device are communicating without providing the feedback data to the computing server, a second state where the technical assistance computing device and the diagnostic computing device stopped communicating without providing the feedback data to the computing server, a third state where the technical assistance computing device and the diagnostic computing device stopped communicating and the technical assistance computing device has provided the feedback data to the computing server.

EEE 22 is the system of EEE 21, wherein the computing server determines that the diagnostic flowchart session is in the second state, and responsively sends a notification to one or more of the technical assistance computing device and the diagnostic computing device requesting the feedback data.

EEE 23 is the system of EEE 22, wherein the computing server switches the state of the diagnostic flowchart session from the second state to the third state upon receiving the feedback data.

EEE 24 is a diagnostic computing device comprising: a network interface; one or more processors in communication with the network interface; and at least one computer-readable medium having stored thereon program instructions, that when executed by the one or more processors, cause the one or more processors to perform operations comprising: sending, through the network interface to a computing server, a first request indicative of a vehicle repair issue for a vehicle; receiving, through the network interface from the computing server, a diagnostic flowchart including a sequence of diagnostic steps for identifying and resolving the vehicle repair issue; sending, through the network interface to the computing server, vehicle condition data collected during execution of the diagnostic flowchart; sending, through the network interface, a second request for further technical assistance in identifying and resolving the vehicle repair issue; in response to the second request, receiving, through the network interface from a technical assistance computing device that is in communication with the computing server, diagnostic assistance information based on the diagnostic flowchart and the vehicle condition data; and sending feedback data indicating whether the vehicle repair issue has been identified and resolved.

EEE 25 is the diagnostic computing device of EEE 24, wherein the operations further comprise: in response to sending the first request, receiving, from the computing server, an identifier associated with an initiated diagnostic flowchart session, wherein sending the second request comprises: sending the second request to the technical assistance computing device such that the second request includes the identifier so as to enable the technical assistance computing device to retrieve the diagnostic flowchart and the vehicle condition data from the computing server based on the identifier.

EEE 26 is a technical assistance computing device comprising: a network interface; one or more processors in communication with the network interface; and at least one computer-readable medium having stored thereon program instructions, that when executed by the one or more processors, cause the one or more processors to perform operations comprising: receiving a request for technical assistance with identifying and resolving a vehicle repair issue, wherein the request includes an identifier of a diagnostic flowchart session conducted between a computing server and a diagnostic computing device, wherein during the diagnostic flowchart session, the computing server provided a diagnostic flowchart to the diagnostic computing device, retrieving, based on the identifier, the diagnostic flowchart and vehicle condition data generated during execution of the diagnostic flowchart at the diagnostic computing device; based on the diagnostic flowchart and the vehicle condition data, sending diagnostic assistance information to the diagnostic computing device, receiving feedback data indicating whether the vehicle repair issue has been identified and resolved based on the diagnostic assistance information, sending, to the computing server, the feedback data and the diagnostic assistance information.

EEE 27 is the technical assistance computing device of EEE 26, wherein the identifier facilitates the diagnostic computing device and the technical assistance computing device displaying common information simultaneously, and wherein the common information comprises the diagnostic flowchart, the vehicle condition data, and the diagnostic assistance information.

EEE 28 is the technical assistance computing device of EEE 26 or 27, wherein the operations further comprise: generating a display of a reminder requesting sending the feedback data to the computing server.

What is claimed is:

1. A method performed by a computing server, the method comprising:
   receiving, from a diagnostic computing device, a first request indicative of a vehicle repair issue for a vehicle;
   sending, to the diagnostic computing device, a diagnostic flowchart including a sequence of diagnostic steps for identifying and resolving the vehicle repair issue;
   receiving, from the diagnostic computing device, (i) a second request for further technical assistance in identifying and resolving the vehicle repair issue, and (ii) vehicle condition data collected during execution of the diagnostic flowchart;
   sending the diagnostic flowchart and the vehicle condition data to a technical assistance computing device;
   receiving, from the technical assistance computing device, input data including (i) diagnostic assistance information that the technical assistance computing device sent to the diagnostic computing device based on the diagnostic flowchart and the vehicle condition data, and (ii) feedback data indicating whether the vehicle repair issue has been identified and resolved;
   updating the diagnostic flowchart based on the input data to generate a modified diagnostic flowchart;
   using the modified diagnostic flowchart for identifying and resolving the vehicle repair issue in other vehicles experiencing the vehicle repair issue; and
   replacing the diagnostic flowchart with the modified diagnostic flowchart when the modified diagnostic flowchart is successful more than a threshold number of times in resolving the vehicle repair issue.

2. The method of claim 1, further comprising:
   in response to receiving the first request, initiating a diagnostic flowchart session; and
   generating an identifier for the diagnostic flowchart session, wherein the second request further includes the identifier so as to facilitate identifying the diagnostic flowchart session.

3. The method of claim 2,
   wherein the identifier facilitates the diagnostic computing device and the technical assistance computing device displaying common information simultaneously, and
   wherein the common information comprises one or more of the diagnostic flowchart, the vehicle condition data, and the diagnostic assistance information.

4. The method of claim 1, wherein the second request further includes contact information for a technician executing the diagnostic flowchart.

5. The method of claim 1, wherein the vehicle condition data collected during execution of the diagnostic flowchart includes one or more of (i) odometer reading of the vehicle, (ii) a diagnostic trouble code (DTC), (iii) a symptom of a malfunction of the vehicle, (iv) Parameter IDs (PIDs) and PID values, (v) sensor data, and (vi) freeze frame data.

6. The method of claim 1, wherein the diagnostic flowchart comprises one or more ordered and performable path elements, wherein each path element leads to one or more decision elements, and wherein each path element comprises one or more of the diagnostic steps.

7. The method of claim 6, wherein the second request further includes at least one of: (i) data indicative of execution of at least one path element of the diagnostic flowchart, (ii) one or more parameters obtained during the execution of the at least one path element, (iii) data indicative of a decision made for at least one decision element of the diagnostic flowchart, and (iv) data indicative of an input from a technician executing the at least one path element.

8. The method of claim 7, wherein the input from the technician includes supplemental information received from an authorized entity, wherein the authorized entity is one of: (i) a vehicle manufacturer, (ii) a vehicle part manufacturer, or (iii) a vehicle service information provider.

9. The method of claim 7, wherein the one or more parameters comprise at least one of: (i) an experience level of the technician, and (ii) an execution time of the at least one path element.

10. The method of claim 1, wherein the first request is further indicative of a geographic location related to a current or prior location of the vehicle, and wherein the method further comprises:
   selecting the diagnostic flowchart based at least in part on the geographic location, wherein the diagnostic flowchart is specific to the vehicle repair issue as experienced by other vehicles at the geographic location related to the current or prior location of the vehicle.

11. The method of claim 1, further comprising:
periodically sending a notification to one or more of the diagnostic computing device and the technical assistance computing device until the feedback data is received.

12. A method performed by a diagnostic computing device, the method comprising:
interfacing with a vehicle electronic control module of a vehicle via a vehicle communication link to obtain information associated with a vehicle repair issue that the vehicle is experiencing;
displaying a user interface comprising selectable vehicle symptoms and characteristics;
based on the information obtained via the vehicle communication link and selected vehicle symptoms and characteristics from the user interface, generating a first request for assistance with diagnosis and resolution of the vehicle repair issue;
sending, to a computing server, the first request indicative of the vehicle repair issue for the vehicle;
receiving, from the computing server, a diagnostic flowchart including a sequence of diagnostic steps for identifying and resolving the vehicle repair issue;
sending, to the computing server, vehicle condition data collected during execution of the diagnostic flowchart;
sending a second request for further technical assistance in identifying and resolving the vehicle repair issue;
in response to the second request, receiving, from a technical assistance computing device that is in communication with the computing server, diagnostic assistance information based on the diagnostic flowchart and the vehicle condition data; and
sending feedback data indicating whether the vehicle repair issue has been identified and resolved based on the diagnostic assistance information.

13. The method of claim 12, wherein sending the second request comprises sending the second request to the computing server.

14. The method of claim 12, wherein based on the first request, a diagnostic flowchart session is initiated and an identifier for the diagnostic flowchart session is generated, wherein sending the second request comprises sending the second request including the identifier to the technical assistance computing device so as to enable the technical assistance computing device to retrieve the diagnostic flowchart and the vehicle condition data from the computing server based on the identifier.

15. The method of claim 14, further comprising:
displaying, simultaneously on a display at the diagnostic computing device and on a display at the technical assistance computing device, the diagnostic flowchart and the vehicle condition data during the diagnostic flowchart session.

16. A system comprising:
a computing server;
a vehicle repair database in communication with the computing server and including a plurality of diagnostic flowcharts associated with repairing vehicles;
a diagnostic computing device in communication with the computing server; and
a technical assistance computing device in communication with the computing server and the diagnostic computing device, wherein:
the diagnostic computing device sends to the computing server a first request indicative of a vehicle repair issue for a vehicle,
responsively, the computing server sends to the diagnostic computing device a diagnostic flowchart from the plurality of diagnostic flowcharts of the vehicle repair database, the diagnostic flowchart including a sequence of diagnostic steps for identifying and resolving the vehicle repair issue,
the diagnostic computing device sends to the computing server vehicle condition data collected during execution of the diagnostic flowchart,
the diagnostic computing device sends a second request for further technical assistance in identifying and resolving the vehicle repair issue,
the computing server sends the diagnostic flowchart and the vehicle condition data to the technical assistance computing device,
based on the diagnostic flowchart and the vehicle condition data, the technical assistance computing device sends diagnostic assistance information to the diagnostic computing device,
the diagnostic computing device sends to the technical assistance computing feedback data indicating whether the vehicle repair issue has been identified and resolved based on the diagnostic assistance information,
the technical assistance computing device sends to the computing server the feedback data and the diagnostic assistance information,
the computing server updates the diagnostic flowchart based on the diagnostic assistance information and the feedback data to generate a modified diagnostic flowchart,
using the modified diagnostic flowchart for identifying and resolving the vehicle repair issue in other vehicles experiencing the vehicle repair issue, and
replacing the diagnostic flowchart in the vehicle repair database with the modified diagnostic flowchart when the modified diagnostic flowchart is successful more than a threshold number of times in resolving the vehicle repair issue.

17. The system of claim 16, wherein the diagnostic computing device sends the second request to the computing server, and wherein in response to the second request, the computing server sends the diagnostic flowchart and the vehicle condition data to the technical assistance computing device.

18. The system of claim 16, wherein the computing server initiates a diagnostic flowchart session and generates an identifier for the diagnostic flowchart session based on the first request, wherein:
the diagnostic computing device receives the identifier from the computing server in response to sending the first request.

19. The system of claim 18, wherein the diagnostic computing device sends the second request to the technical assistance computing device such that the second request includes the identifier so as to enable the technical assistance computing device to retrieve the diagnostic flowchart and the vehicle condition data from the computing server based on the identifier.

20. The system of claim 19, further comprising:
a first display coupled to the diagnostic computing device; and
a second display coupled to the technical assistance computing device, wherein the diagnostic flowchart and information indicative of the vehicle condition data are simultaneously displayed on the first display and the second display after the technical assistance computing device retrieves the diagnostic flowchart and the vehicle condition data.

21. The system of claim 18, wherein the computing server determines a state of the diagnostic flowchart session, and wherein the state is one of at least three states:
   a first state where the technical assistance computing device and the diagnostic computing device are communicating without providing the feedback data to the computing server,
   a second state where the technical assistance computing device and the diagnostic computing device stopped communicating without providing the feedback data to the computing server,
   a third state where the technical assistance computing device and the diagnostic computing device stopped communicating and the technical assistance computing device has provided the feedback data to the computing server.

22. The system of claim 21, wherein the computing server determines that the diagnostic flowchart session is in the second state, and responsively sends a notification to one or more of the technical assistance computing device and the diagnostic computing device requesting the feedback data.

23. The system of claim 22, wherein the computing server switches the state of the diagnostic flowchart session from the second state to the third state upon receiving the feedback data.

24. A diagnostic computing device comprising:
   a network interface;
   one or more processors in communication with the network interface; and
   at least one computer-readable medium having stored thereon program instructions, that when executed by the one or more processors, cause the one or more processors to perform operations comprising:
      interfacing with a vehicle electronic control module of a vehicle via a vehicle communication link to obtain information associated with a vehicle repair issue that the vehicle is experiencing;
      displaying a user interface comprising selectable vehicle symptoms and characteristics;
      based on the information obtained via the vehicle communication link and selected vehicle symptoms and characteristics from the user interface, generating a first request for assistance with diagnosis and resolution of the vehicle repair issue;
      sending, through the network interface to a computing server, the first request indicative of the vehicle repair issue for the vehicle;
      receiving, through the network interface from the computing server, a diagnostic flowchart including a sequence of diagnostic steps for identifying and resolving the vehicle repair issue;
      sending, through the network interface to the computing server, vehicle condition data collected during execution of the diagnostic flowchart;
      sending, through the network interface, a second request for further technical assistance in identifying and resolving the vehicle repair issue;
      in response to the second request, receiving, through the network interface from a technical assistance computing device that is in communication with the computing server, diagnostic assistance information based on the diagnostic flowchart and the vehicle condition data; and
      sending feedback data indicating whether the vehicle repair issue has been identified and resolved.

25. The diagnostic computing device of claim 24, wherein the operations further comprise:
   in response to sending the first request, receiving, from the computing server, an identifier associated with an initiated diagnostic flowchart session, wherein sending the second request comprises:
   sending the second request to the technical assistance computing device such that the second request includes the identifier so as to enable the technical assistance computing device to retrieve the diagnostic flowchart and the vehicle condition data from the computing server based on the identifier.

26. A technical assistance computing device comprising:
   a network interface;
   one or more processors in communication with the network interface; and
   at least one computer-readable medium having stored thereon program instructions, that when executed by the one or more processors, cause the one or more processors to perform operations comprising:
      receiving a request for technical assistance with identifying and resolving a vehicle repair issue, wherein the request includes an identifier of a diagnostic flowchart session conducted between a computing server and a diagnostic computing device, wherein during the diagnostic flowchart session, the computing server provided a diagnostic flowchart to the diagnostic computing device, wherein the diagnostic flowchart comprises a plurality of performable path elements, wherein each path element comprises one or more diagnostic steps,
      retrieving, based on the identifier, the diagnostic flowchart and vehicle condition data generated during execution of the diagnostic flowchart at the diagnostic computing device;
      displaying (i) information indicative of which path elements of the diagnostic flowchart have been performed, and (ii) the vehicle condition data associated with the path elements that have been performed;
      based on the information displayed, the diagnostic flowchart and the vehicle condition data, sending diagnostic assistance information to the diagnostic computing device,
      receiving feedback data indicating whether the vehicle repair issue has been identified and resolved based on the diagnostic assistance information, and
      sending, to the computing server, the feedback data and the diagnostic assistance information.

27. The technical assistance computing device of claim 26, wherein the identifier facilitates the diagnostic computing device and the technical assistance computing device displaying common information simultaneously, and wherein the common information comprises the diagnostic flowchart, the vehicle condition data, and the diagnostic assistance information.

28. The technical assistance computing device of claim 26, wherein the operations further comprise:
   generating a display of a reminder requesting sending the feedback data to the computing server.

* * * * *